United States Patent [19]
Nishio

[11] Patent Number: 6,075,630
[45] Date of Patent: Jun. 13, 2000

[54] ELECTRO/OPTICAL COMBINED TYPE NETWORK NODE CONTROL SYSTEM

[75] Inventor: Makoto Nishio, Tokyo, Japan

[73] Assignee: NEC Corporation, Tokyo, Japan

[21] Appl. No.: 09/032,801

[22] Filed: Mar. 2, 1998

[30] Foreign Application Priority Data

Feb. 28, 1997 [JP] Japan .................................... 9-045732

[51] Int. Cl.[7] ............................ H01P 1/10; H04B 10/08; H04J 3/14; H04J 14/00
[52] U.S. Cl. ......................... 359/110; 359/139; 359/123; 359/118; 359/135; 359/124
[58] Field of Search .................... 359/123, 128, 359/135, 139, 124; 370/397, 399, 409, 468

[56] References Cited

U.S. PATENT DOCUMENTS

| | | | |
|---|---|---|---|
| 5,493,573 | 2/1996 | Kobayashi et al. | 370/60 |
| 5,610,913 | 3/1997 | Tomonaga | 370/219 |
| 5,689,499 | 11/1997 | Hullett et al. | 370/235 |
| 5,757,798 | 5/1998 | Hamaguchi | 370/397 |
| 5,815,490 | 9/1998 | Lu | 370/223 |

FOREIGN PATENT DOCUMENTS

| | | |
|---|---|---|
| 4-35252 | 2/1992 | Japan . |
| 6-37783 | 2/1994 | Japan . |

OTHER PUBLICATIONS

H. Ishikawa, "A New Concept for Telecommunications Network Architecture", NTT R & D, vol. 38, No. 4, 1989, pp. 395–408

Y. Kajiyama, "An ATM VP–Based Self–Healing Ring", IEEE Journal on Selected Areas in Communications, vol. 12, No. 1, Jan. 1994, pp. 171–178.

Y. Kajiyama, "Self–Healing ATM Networks Based on Virtual Path Concept", IEEE Journal on Selected Areas in Communications, vol. 12, No. 1, Jan. 1994, pp. 120–127.

K. Sato et al., "Network Performance and Integrity Enhancement with Optical Path Layer Technologies", IEEE Journal on Selected Areas in Communications, vol. 12, No. 1, Jan. 1994. pp. 159–170.

A. Watanabe et al., "Optical Path Cross–Connect Node Architecture Offering High Modularity for Virtual Wavelength Paths", IEICE Trans. Commun., vol. E78–B, No. 5, May 1995, pp. 686–693.

A. Watanabe et al., "Optical Path Cross–Connect Node Architecture with High Modularity for Photonic Transport Networks", IEICE Trans. Commun., vol. E77–B, No. 10, Oct. 1994, pp. 1220–1229.

(List continued on next page.)

*Primary Examiner*—Leslie Pascal
*Assistant Examiner*—Agustin Bello
*Attorney, Agent, or Firm*—Sughrue, Mion, Zinn, Macpeak & Seas, PLLC

[57] ABSTRACT

Traffic characteristics of virtual paths 140 through 142 are monitored. A network node 120 notifies a network management system 170 that the traffic characteristics exceeds a predetermined threshold value, if it happens. The network management system 170 establishes an optical path 220 between certain network nodes 100 and 130 and use the optical path to transfer the virtual paths 141 and 142 multiplexed with optical paths 160 through 162 previously established for the individual transmission paths. On the other hand, the virtual paths 141 and 142 transferred on the optical path 220 are inverse switched into the optical paths 160 through 162, when the traffic characteristics for the virtual paths 141 and 142 are within the threshold value.

18 Claims, 16 Drawing Sheets

OTHER PUBLICATIONS

Hiroshi Ishikawa, "A new Concept for Telecommunications Network Architecture", *NTT R&D*, vol. 38, No. 4, 1989, pp. 395–408.

Yoshio Kajiyama et al., "An ATM VP–Based Self–Healing Ring", *IEEE Journal on Selected Areas in Communications*, vol. 12, No. 1, Jan. 1994, pp. 171–178.

Ryutaro Kawamura et al., "Self–Healing ATM networks Based on Visual Path Concept", *IEEE Journal on Selected Areas in Communications*, vol. 12, No. 1, Jan. 1994, pp. 120–127.

Ken–ichi Sato et al., "Network Performance and Integrity Enhancement with Optical Path Layer Technologies", *IEEE Journal on Selected Areas in Communications*, vol. 12, No. 1, Jan. 1994, pp. 159–170.

Atsushi Watanabe et al., "Optical Path Cross–Connect Node Architecture Offering High Modularity for Virtual Wavelength Paths", *IEICE Trans. Commun.*, vol. E78–B, No. 5, May 1995, pp. 686–693.

Atsushi Watanabe et al., "Optical Path Cross–Connect Node Architecture with High Modularity for Photonic Transport Networks", *IEICE Trans. Commun.*, vol. E77–B, No. 10, Oct. 1994, pp. 1220–1229.

Makoto Nishio et al., "A Study o ATM Subscriber Acess Networks", Technical Report of IEICE, (Feb. 1996), vol. 95, No. 510, pp. 31–36.

Nakahira Yoshihiro et al., "A Photonic Cross Connect System Based on Layered Structure and A Pre–Proto Demonstrator", Technical Report of IEICE, vol. 95, No. 509.

ELECTRO/OPTICAL COMBINED TYPE NETWORK NODE CONTROL SYSTEM

BACKGROUND OF THE INVENTION

The present invention relates to an electro/optical combined type network node control system for use in a transport network with electrical paths and optical paths.

Recent advance in optical fiber transmission technologies has further improved the transmission bandwidth. Coupled with this improvement, development of a high-speed broadband transmission network has been anticipated that provides integrated communication services for audio, text, and/or image data. A transfer network technology is one of the essential factors for the realization of the high-speed broadband transmission network. The transfer network is in a hierarchical form of a line (channel) layer, a path layer, and a transmission path medium layer, as described in Ishikawa, "A New Concept for Telecommunications Network Architecture", NTT R & D, Vol. 38, No. 4, 1989, pp. 395–408 (1989). Typical switching systems switch a connection established between end users. The connections between the switch systems are combined into a path. Therefore, the connections are switched by path in a cross-connecting unit placed between the switch systems and re-directed towards the destination. The data are thus transferred between the switch systems.

The path layer, which is the "brain" of the transfer network, uses layered paths based on new synchronous digital hierarchy (SDH) in a synchronous transfer mode (STM). In addition, the path layer also employs a virtual path supporting an asynchronous transfer mode (ATM). The path supporting the SDH/ATM is generally referred to as an electrical path.

A conventional transport network using a virtual path is described in, for example, Yoshio Kajiyama et al., "An ATM VP-based Self-healing Ring", IEEE Journal on Selected Areas in Communications, vol. 12, No. 1, pp. 171–178 (January 1994). A transport network system using the above-mentioned virtual paths consists of a plurality of network nodes. For the transport network system consisting of first through third network nodes, each network node has a virtual path switch. A network node is connected to an adjacent network node via a bi-directional transmission path. A first bi-directional virtual path is transferred between the first and second network nodes. A second bi-directional virtual path is transferred between the first and third network nodes through the second network node. The first through third network nodes are further connected to a different (or remote) network such as an area network, a subscriber's access network, and a local area network. The virtual path extending from the first network node to the different network is switched with different other network nodes. In contrast, the virtual path from the different network nodes is switched with a different network connected to the first network node. For the switching of the virtual path from the first network node to the third network node, no switching is made in the second network node located between the first and third network nodes.

A detailed configuration/architecture of the above-mentioned network nodes and the virtual path switches is described in, for example, Yoshio Kajiyama et al., "An ATM VP-based Self-healing Ring", IEEE Journal on Selected Areas in Communications, vol. 12, No. 1, pp. 171–178 (January 1994), and Ryutaro Kawamura et al., "Self-healing ATM Networks Based on Virtual Path Concept", IEEE Journal on Selected Areas in Communications, vol. 12, No. 1, pp. 120–127 (January 1994). According to these articles, the network node is referred to as a cross-connecting unit or an add/drop multiplexer (ADM).

The transport network system with the above-mentioned virtual path either switches the virtual path from the network connected to the local network node to any one of different network nodes, or switches the virtual path from the different or remote network node to the network connected to the local network node. No switching is made in the network node between the local network node and the other network node. This allows elimination of one-by-one switching of the virtual channels in the virtual path.

The introduction of an optical path, in combination with the electrical path based on the above-mentioned electrical transmission switch technique, has been examined to improve transmission capacity of the transport network. An example of the transport network using such an optical path is supposed in, for example, Ken-ichi Sato et al., "Network Performance and Enhancement with Optical Path Layer Technologies", IEEE Journal on Selected Areas in Communications, vol. 12, No. 1, pp. 159–170 (January 1994).

For the transport network consisting of first through fourth network nodes using the above-mentioned optical paths, each network node has a virtual path switch and an optical path switch. A network node is connected to an adjacent network node via a bi-directional transmission path. A first bi-directional optical path is established between the first and second network nodes. A second bi-directional optical path is established between the first and third network nodes. A third bi-directional optical path is established between the first and fourth network nodes. The first through third bi-directional virtual paths are multiplexed into the first through third optical paths, respectively, and are switched from one network node to the other via the network nodes.

Each network node "maps" the virtual and optical paths. More specifically, the virtual path switch in the first network node multiplexes/demultiplexes the first virtual path for the first optical path, multiplexes/demultiplexes the second virtual path for the second optical path, and multiplexes/demultiplexes the third virtual path for the third optical path. Likewise, the virtual path switch in the second network node multiplexes/demultiplexes the first virtual path for the first optical path. The virtual path switch in the third network node multiplexes/demultiplexes the second virtual path for the second optical path. The virtual path switch in the third network node multiplexes/demultiplexes the second virtual path for the second optical path. The virtual path switch in the fourth network node multiplexes/demultiplexes the third virtual path for the third optical path.

The second network node switches the second and third optical paths from the adjacent first and third network nodes to the third and first network nodes, respectively, by means of the local optical path switch. Likewise, the third network node switches the third optical paths from the adjacent second and fourth network nodes to the fourth and second network nodes, respectively, by means of the local optical path switch.

A detailed configuration architecture of the above-mentioned network nodes and the optical path switches is described in, for example, Atsushi Watanabe, Satoru Okamoto, and Ken-ichi Sato, "Optical Path Cross-Connect Node Architecture offering High Modularity for Virtual Wavelength Path", IEICE Trans. Commun. Vol. E78-B, No. 5, pp. 686–693 (May 1995), and Atsushi Watanabe, Satoru Okamoto, and Ken-ichi Sato, "Optical Path Cross-Connect Node Architecture with High Modularity for Photonic Transport Networks", IEICE Trans. Commun. Vol. E77-B, No. 10, pp. 1220–1229 (October 1994).

Each optical path corresponds to an optical wavelength signal in conventional transport networks involved in a wavelength division multiplexing and a certain wavelength may be selected for a single optical path. Alternatively, the certain wavelength is selected for each connection between the network nodes and the signal on that wavelength is switched in a trunk network node. In any cases, routing and switching technique for the optical wavelengths are still under development. These techniques require no complicated header processing such as cell switching achieved in an ATM virtual path switch and is based on a simple principle. Accordingly, they are expected to find wide variety of applications to a high speed, large capacity switch system.

The transport network system using the above-mentioned optical path multiplexes a plurality of electrical paths into a single optical path that are directed to the same destination. The network node located on the optical path switches the optical path without changing it into an electrical signal. Thus, the network nodes are directly connected to each other by means of the optical path. This reduces a load on the electrical path switch for switching.

Traffic characteristics of the virtual path vary or fluctuate successively. However, an optical path is fixedly allocated to the electrical paths directed to the same destination. Therefore, a plurality of optical paths and, in turn, different wavelengths are required to establish the optical paths between certain network nodes.

SUMMARY OF THE INVENTION

According to the present invention, there is provided an electro/optical combined type network node control system implemented in a transport network having a plurality of optical paths and a plurality of electrical paths, the optical paths being established previously for individual transmission paths and the electrical paths being multiplexed into the optical paths, comprising first through N-th electro/optical combined type network nodes (N is an integer equal to or larger than 2) connected to each other through the transmission path, the network nodes having an electrical path switch for switching the electrical path passing therethrough and an optical path switch for switching the optical path passing therethrough, and a network management system connected to the network nodes for use in controlling the network nodes, wherein each of the network nodes is adapted to measure an amount of traffic across the electrical paths and to produce a switch request signal when the measured amount of traffic is larger than a predetermined traffic threshold value, and said network management system supplies, in response to the switch request signal, a switch control signal to the network nodes, the switch control signal indicating to establish an alternate optical path among the network nodes other than the network node producing the switch request signal and to switch the electrical paths into the alternate optical path, the network nodes in response to the switch control signal switching the electrical paths into the alternate optical path, the network nodes on the sending and the receiving sides of the alternate optical path measuring the amount of traffic across the electrical paths after switching to the alternate optical path and producing an inverse switch request signal when the measured amount of traffic is within the predetermined traffic threshold value, and the network management system producing, in response to the inverse switch request signal, an inverse switch control signal indicating to release the alternate optical path and to inverse switch the electrical paths multiplexed with the alternate optical path into the plurality of optical paths, the network nodes on the sending and the receiving sides of the alternate optical path releasing the alternate optical path in response to the inverse switch control signal and inverse switching the electrical paths multiplexed with the alternate optical path into a plurality of optical paths.

According to the present invention, there is also provided an electro/optical combined type network node control system implemented in a transport network having a plurality of optical paths and a plurality of electrical paths, the optical paths being established previously for individual transmission paths and the electrical paths being multiplexed with the optical paths, comprising first through N-th electro/optical combined type network nodes (N is an integer equal to or larger than 2) connected to each other through the transmission path, the network nodes having an electrical path switch for switching the electrical path passing therethrough, an optical path switch for switching the optical path passing therethrough, and node control means connected to the electrical path switch and the optical path switch, wherein the node control means comprises an electrical path monitor unit adapted to measure an amount of traffic across the electrical paths and to produce a signal indicative of the measured amount of traffic, and a node control unit for controlling the electrical path switch and the optical path switch, the node control unit producing a switch request signal when the measured amount of traffic is larger than a predetermined traffic threshold value, and supplying a switch control signal to the node control units in the remote network nodes other than the local network node in response to the reception of the switch request signal from the node control unit in one of the remote network nodes, the switch control signal indicating to establish an alternate optical path among the network nodes other than the network node producing the control request signal and to switch the electrical paths into the alternate optical path, the optical path switch establishing the alternate optical path in response to the reception of the switch control signal through the node control unit and subsequently, the electrical path switch switching the electrical paths to the alternate optical path in response to the reception of the switch control signal through the node control unit, the node control units in the network nodes on the sending and the receiving sides of the alternate optical path producing an inverse switch request signal when the measured amount of traffic is within the predetermined traffic threshold value after switching to the alternate optical path and supplying a switch control signal to the node control units in the remote network nodes other than the local node control unit in response to the reception of the inverse switch request signal from the node control unit in one of the remote network nodes, the inverse switch control signal indicating to release the alternate optical path and to inverse switching the electrical paths multiplexed with the alternate optical path into a plurality of optical paths, the optical path switch releasing the alternate optical path in response to the inverse switch control signal through the node control unit and the electrical path switch then inverse switching the electrical paths multiplexed with the alternate optical path into a plurality of optical paths.

DESCRIPTION OF THE PREFERRED EMBODIMENTS

Figure 1:
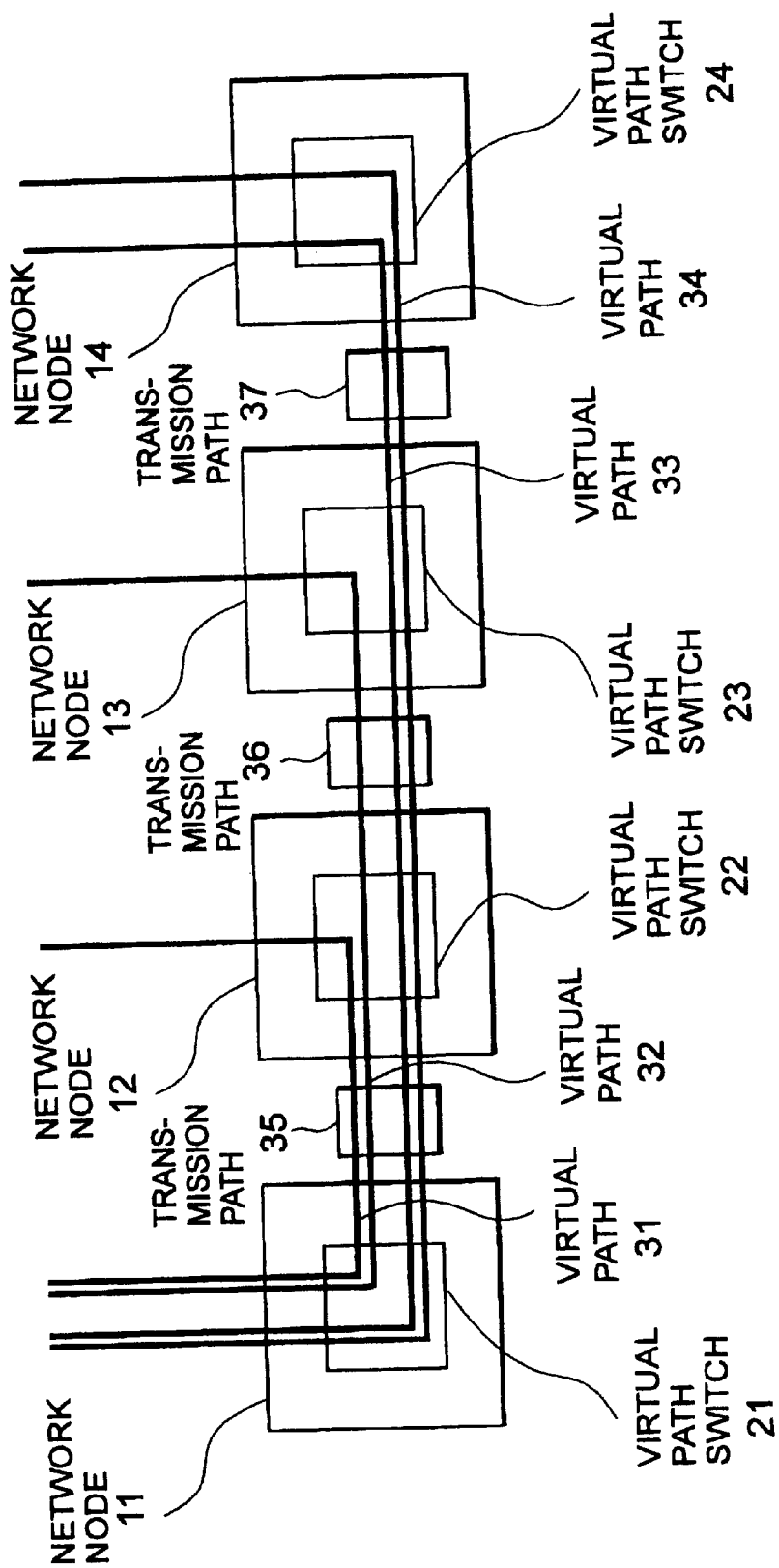
FIG. 1 is a view for use in describing a transport network using conventional electrical paths.

Referring to FIG. 1, a conventional transport network using electrical paths is described. In FIG. 1, the transport network comprises network nodes 11, 12, 13, and 14. The network nodes 11, 12, 13, and 14 has virtual path switches 21, 22, 23, and 24, respectively. The network nodes 11 and 12 are connected to each other via a bi-directional transmission path 35. The network nodes 12 and 13 are connected to each other via a bi-directional transmission path 36. Likewise, the network nodes 13 and 14 are connected to each other via a bi-directional transmission path 37.

A bi-directional virtual path 31 is transferred between the network nodes 11 and 12. A bi-directional virtual path 32 is transferred between the network nodes 11 and 13 through the network node 12. Likewise, bi-directional virtual paths 33 and 34 are transferred between the network nodes 11 and 14 through the network nodes 12 and 13.

The network nodes 11, 12, 13, and 14 are each connected to a network (not shown) such as an area network, a subscriber's access network, or a local area network. The virtual path from the network connected to the local network node is switched to a different or remote network node. On the contrary, the virtual path from a remote network node is switched to the network connected to the local network node.

More specifically, the virtual paths 31 through 34 from the network connected to the network node 11 are switched to the network node 12 by means of the virtual path switch 21. The virtual paths 31 through 34 from the network node 12 are switched to the network connected to the network node 11 by means of the virtual path switch 21.

The virtual path 31 from the network connected to the network node 12 is switched to the network node 11 by means of the virtual path switch 22. The virtual path 31 from the network node 11 is switched to the network connected to the network node 12 by means of the virtual path switch 22. The virtual path 32 from the network connected to the network node 13 is switched to the network node 12 by means of the virtual path switch 23. The virtual path 32 from the network node 12 is switched to the network connected to the network node 13 by means of the virtual path switch 23.

Likewise, the virtual paths 33 and 34 from the network connected to the network node 14 are switched to the network node 13 by means of the virtual path switch 24. The virtual paths 33 and 34 from the network node 13 are switched to the network connected to the network node 14 by means of the virtual path switch 24. The network nodes 12 and 13 transfer the virtual path to the adjacent network node.

For the network node 12, the virtual path 32 from the adjacent network node 11 is switched to the network node 13 by means of the virtual path switch 22. The virtual paths 33 and 34 from the adjacent network node 13 are switched to the network node 11 by means of the virtual path switch 22.

For the network node 13, the virtual paths 33 and 34 from the adjacent network node 12 are switched to the network node 14 by means of the virtual path switch 23. The virtual paths 33 and 34 from the network node 14 are switched to the network node 12 by means of the virtual path switch 23.

Details of the above-mentioned network nodes and the virtual path switches is described in, for example, Yoshio Kajiyama et al., "An ATM VP-based Self-healing Ring", IEEE Journal on Selected Areas in Communications, vol. 12, No. 1, pp. 171–178 (January 1994), and Ryutaro Kawamura et al., "Self-healing ATM Networks Based on Virtual Path Concept", IEEE Journal on Selected Areas in Communications, vol. 12, No. 1, pp. 120–127 (January 1994). According to these articles, the network nodes 11 through 14 are each referred to as a cross-connecting unit or an add/drop multiplexer (ADM).

As described above, the network nodes 11 through 14 transfers the virtual path from the network connected to the local network node to any one of remote network nodes and switch the virtual path from the remote network node to the network connected to the local network node. No switching is made in the network node between the local network node and the other network node. This allows elimination of one-by-one switching of the virtual channels in the virtual path.

The introduction of an optical path, in combination with the electrical path based on the above-mentioned electrical transmission switch technique described in conjunction with FIG. 1, has been examined to improve transmission capacity of the transport network.

Figure 2:
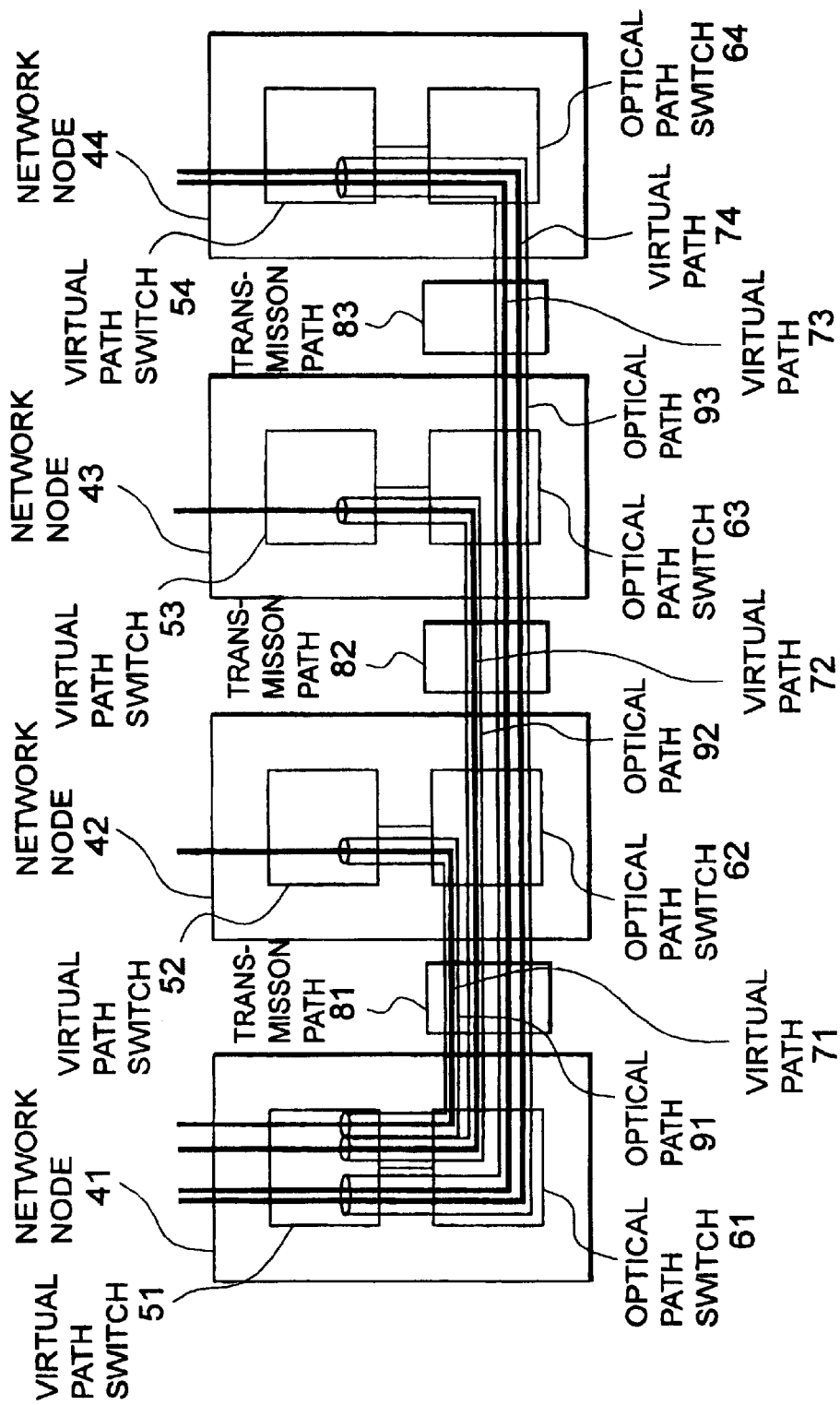
FIG. 2 is a view for use in describing a transport network using conventional optical paths.

Referring to FIG. 2, a conventional transport network using optical paths is described. In FIG. 2, the transport network comprises network nodes 41, 42, 43, and 44. The network nodes 41, 42, 43, and 44 have virtual path switches 51, 52, 53, and 54, respectively. The network nodes 41, 42, 43, and 44 also have optical path switches 61, 62, 63, and 64, respectively.

The network nodes 41 and 42 are connected to each other via a bi-directional transmission path 81. The network nodes 42 and 43 are connected to each other via a bi-directional transmission path 82. The network nodes 43 and 44 are connected to each to each other via a bi-directional transmission path 83.

A bi-directional virtual path 71 is transferred from the network node 41 to the network node 42. A bi-directional virtual path 72 is transferred from the network node 41 to the network node 43 through the network node 42. A bi-directional virtual paths 73 and 74 are transferred from the network node 41 to the network node 44 through the network nodes 42 and 43.

A bi-directional optical path 91 is established between the network nodes 41 and 42. A bi-directional optical path 92 is established between the network nodes 41 and 43. A bi-directional optical path 93 is established between the network nodes 41 and 44.

The network node 41 that terminates the optical paths 91 through 93 "maps" the virtual and optical paths. Likewise, the network nodes 42, 43, and 44 that terminate the optical paths 91, 92, and 93, respectively, map the virtual and optical paths.

More specifically, the virtual path 71 is multiplexed with and demultiplexed from the optical path 91 by means of the virtual path switch 51. The virtual path 72 is multiplexed with and demultiplexed from the optical path 92 by means of the virtual path switch 51. The virtual paths 73 and 74 are multiplexed with and demultiplexed from the optical path 93 by means of the virtual path switch 51. The virtual path 71 is multiplexed with and demultiplexed from the optical path 91 by means of the virtual path switch 52. The virtual path 72 is multiplexed with and demultiplexed from the optical path 92 by means of the virtual path switch 53. Likewise, the virtual path 73 is multiplexed with and demultiplexed from the optical path 93 by means of the virtual path switch 54.

The optical path 92 extending from the network node 41 to the network node 42 is switched to the network node 43 by means of an optical path switch 62. The optical path 93 extending from the network node 43 to the network node 42 is switched to the network node 41 by means of the optical path switch 62. The optical path 93 from the network node 42 is switched to the network node 44 by means of an optical path switch 63.

For the network nodes 41 through 44 as well as the optical path switches 61 through 64 in FIG. 2 are described in, for example, Atsushi Watanabe, Satoru Okamoto, and Ken-ichi Sato, "Optical Path Cross-Connect Node Architecture offering High Modularity for Virtual Wavelength Path", IEICE Trans. Commun. Vol. E78-B, No. 5, pp. 686–693 (May 1995), and Atsushi Watanabe, Satoru Okamoto, and Ken-ichi Sato, "Optical Path Cross-Connect Node Architecture with High Modularity for Photonic Transport Networks", IEICE Trans. Commun. Vol. E77-B, No. 10, pp. 1220–1229 (October 1994).

The optical paths 91 through 93 correspond to an optical wavelength signal in the above-mentioned conventional transport networks involved in a wavelength division multiplexing. In such a transport network, a certain single wavelength may be selected for a single optical path. Alternatively, the certain wavelength is selected for each connection between the network nodes and the signal on that wavelength is switched in a trunk network node. In any cases, routing and switching technique for the optical wavelengths are still under development. These techniques require no complicated header processing such as cell switching achieved in an ATM virtual path switch and is based on a simple principle. Accordingly, they are expected to find wide variety of applications to a high speed, large capacity switch system.

The network nodes 41 through 44 multiplex a plurality of electrical paths into a single optical path that are directed to the same destination. The network node located on the optical path switches the optical path without changing it into an electrical signal. Thus, the network nodes are directly connected to each other by means of the optical path. This reduces a load on the electrical path switch for switching.

Traffic characteristics of the virtual path vary or fluctuate successively. However, an optical path is fixedly allocated to the electrical paths directed to the same destination. Therefore, a plurality of optical paths and, in turn, different wavelengths are required to establish the optical paths between certain network nodes.

Figure 3:
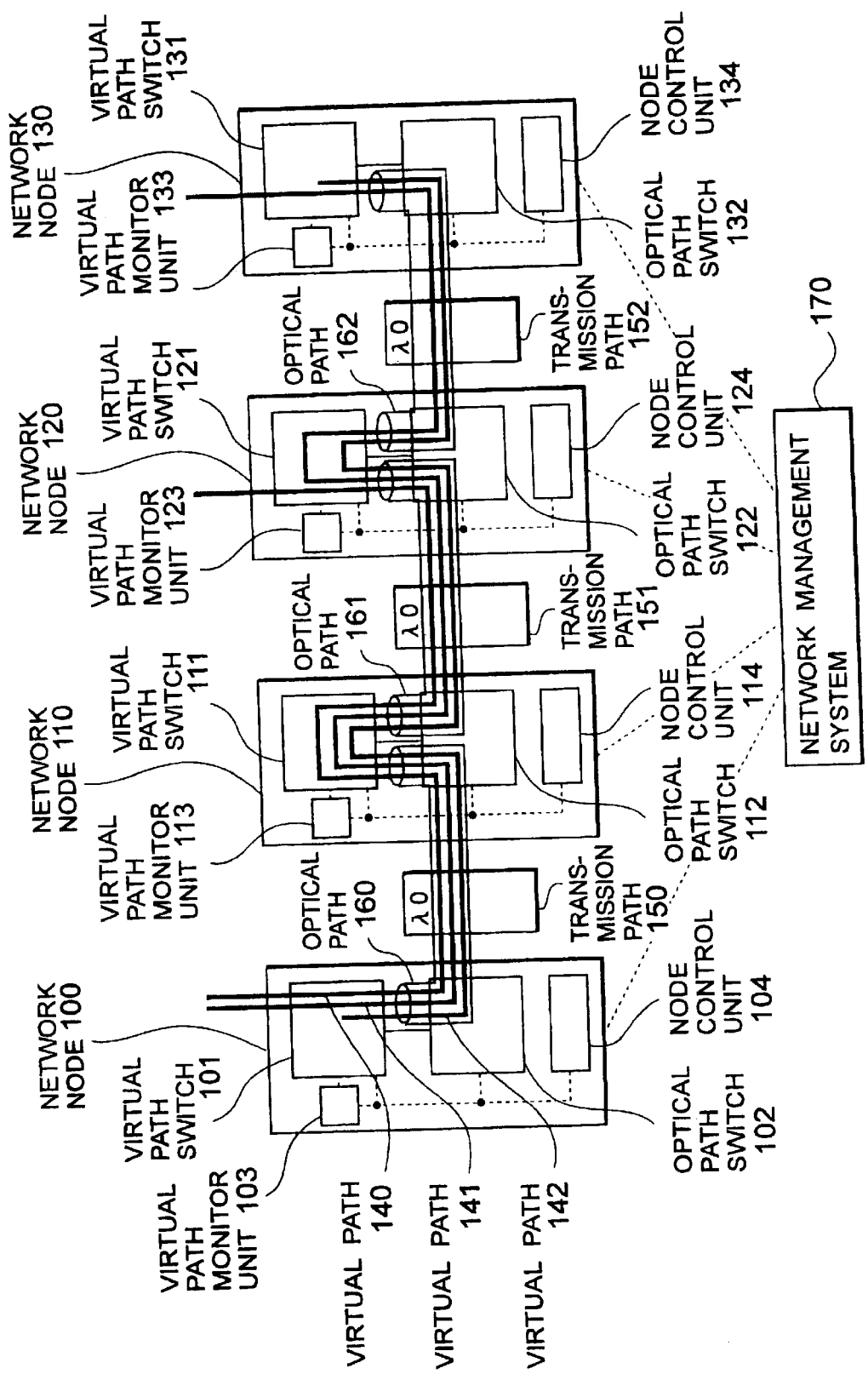
FIG. 3 is a view for use in describing a transport network implementing an electro/optical combined type network node control system according to a first embodiment of the present invention.

Referring to FIG. 3, an electro/optical combined type network node control system according to a first embodiment of the present invention is described. FIG. 3 shows a transport network to which the electro/optical combined type network node control system of the first embodiment can be applied. The transport network comprises electro/optical combined type network nodes (hereinafter, referred to as a network node) 100, 110, 120, and 130. For convenience, electrical transport units in the network nodes are described in conjunction with an ATM virtual path. However, the present invention is not limited to such applications. The present invention can be applied to other combined type network nodes based on a different electrical transport technique including SDH and PDH.

In FIG. 3, the network node 100 has a virtual path switch 101, an optical path switch 102, a virtual path monitor unit 103, and a node control unit 104. The network node 110 has a virtual path switch 111, an optical path switch 112, a virtual path monitor unit 113, and a node control unit 114. The network node 120 has a virtual path switch 121, an optical path switch 122, a virtual path monitor unit 123, and a node control unit 124. The network node 130 is formed of a virtual path switch 131, an optical path switch 132, a virtual path monitor unit 133, and a node control unit 134.

In the embodiment illustrated in FIG. 3, the network nodes 100 and 110 are connected to each other via a bi-directional transmission path 150. The network nodes 110 and 120 are connected to each other via a bi-directional transmission path 151. The network nodes 120 and 110 are connected to each other via a bi-directional transmission path 152. A bi-directional optical path 160 having a wavelength $\lambda 0$ is previously established between the network nodes 100 and 110. A bi-directional optical path 161 having a wavelength $\lambda 1$ is previously established between the network nodes 110 and 120. A bi-directional optical path 162 having a wavelength $\lambda 2$ is previously established between the network nodes 120 and 130. A bi-directional virtual path 140 is transferred from the network node 100 to the network node 120. Bi-directional virtual paths 141 and 142 are transferred from the network nodes 100 to the network node 130 via the network nodes 110 and 120.

The network nodes 100, 110, 120, and 130 are connected to a network (not shown) such as an area network, a subscriber's access network, or a local area network. The network nodes 100, 110, 120, and 130 switch the virtual path from the network connected to the local network node or switch the virtual path terminated by the local network node. The network nodes 100, 110, 120, and 130 switch the virtual path from a remote network node to the network connected to the local network node or terminate that virtual path.

The network nodes 100 and 110 that terminate the optical path 160 "map" the virtual and optical paths. Likewise, the network nodes 110 and 120 that terminate the optical path 161 map the virtual and optical paths. The network nodes 120 and 130 that terminate the optical path 162 map the virtual and optical paths. The virtual path switch 101 multiplexes the virtual paths 140 and 141 from the network connected to the network node 100 with the virtual path 142 terminated by the network node 100 with the optical path 160 with the wavelength $\lambda 0$.

For the network node 100, the optical path switch 102 transfers the optical path 160 with the wavelength $\lambda 0$ through the transmission path 150 to the network node 110. The optical path switch 102 switches the optical path 160 with the wavelength $\lambda 0$ from the network node 110 transferred through the transmission path 150 into the virtual path switch 101. The virtual path switch 101 demultiplexes the virtual paths 140 through 142 from the optical path 160 and transfers the virtual paths 140 and 141 to the network connected to the network node 100 while terminates the virtual path 142.

For the network node 110, the optical path switch 112 switches the optical path 160 with the wavelength $\lambda 0$ from the network node 100 to the virtual path switch 111. The virtual path switch 111 demultiplexes the virtual paths 140 through 142 from the optical path 160 with the wavelength $\lambda 0$ and multiplexes them with the optical path 161 with the wavelength $\lambda 0$. The optical path switch 112 transfers the optical path 161 with the wavelength $\lambda 0$ through the transmission path 151 to the network node 120. The optical path switch 112 switches the optical path 161 with the wavelength $\lambda 0$ from the network node 120 to the virtual path switch 111. The virtual path switch 111 demultiplexes the virtual paths 140 through 142 from the optical path 161 with the wavelength $\lambda 0$ and multiplexes them again with the optical path 160 with the wavelength $\lambda 0$. The optical path switch 112 transfers the optical path 160 with the wavelength $\lambda 0$ to the network node 100 via the transmission path 150.

For the network node 120, the optical path switch 122 switches the optical path 161 with the wavelength $\lambda 0$ from the network node 110 to the virtual path switch 121. The virtual path switch 121 demultiplexes the virtual paths 140 through 142 from the optical path 161 with the wavelength $\lambda 0$. The virtual path switch 121 transfers the virtual path 140 to the network connected to the network node 120 and multiplexes the virtual paths 141 and 142 again into the optical path 162 with the wavelength $\lambda 0$. The optical path switch 122 transfers the optical path 162 with the wavelength $\lambda 0$ to the network node 130 via the transmission path 152.

The optical path switch 122 switches the optical path 162 with the wavelength $\lambda 0$ from the network node 130 to the virtual path switch 121. The virtual path switch 121 demultiplexes the virtual paths 140 through 142 from the optical path 162 with the wavelength $\lambda 0$. The virtual path switch 121 multiplexes the virtual path 140 from the network connected to the network node 120 with the virtual paths 141 and 142 again into the optical path 161 with the wavelength $\lambda 0$. Thereafter, the optical path switch 122 transfers the optical path 161 with the wavelength $\lambda 0$ to the network node 110 via the transmission path 151.

For the network node 130, the optical path switch 132 switches the optical path 162 with the wavelength $\lambda 0$ from the network node 120 to the virtual path switch 131. The virtual path switch 131 demultiplexes the virtual paths 141 and 142 from the optical path 162 with the wavelength $\lambda 0$. The virtual path switch 131 transfers the virtual path 141 to the network connected to the network node 131 and terminates the virtual path 142. The virtual path switch 131 multiplexes the virtual path 141 from the network connected to the network node 130 into the virtual path 142 terminated by the network node 130 with the optical path 162 with the wavelength $\lambda 0$. The optical path switch 132 transfers the optical path 162 with the wavelength $\lambda 0$ to the network node 120 via the transmission path 152.

Virtual path monitor units 103, 113, 123, and 133 measure the amount of traffic on the virtual paths switched by the virtual path switches 101, 111, 121, and 131, respectively. The virtual path monitor units 103, 113, 123, and 133 notify node control units 104, 114, 124, and 134, respectively, of the result of measurements (hereinafter, referred to as a monitoring result).

The node control units 104, 114, 124, and 134 supply a switch request signal to a network management system 170 according to the monitoring result from the virtual path monitor units 103, 113, 123, and 133, respectively. The switch request signal is for requesting new establishment of another optical path to transmit the virtual paths to be multiplexed with the optical paths 160 through 162 with the wavelength $\lambda 0$. Of the node control units 104, 114, 124, and 134, the node control units at the sending and receiving units in that another optical path sends an inverse switch request signal to the network management system 170 according to the monitoring result from the virtual path monitor units that correspond to the respective node control units. The inverse switch request signal is for requesting inverse multiplex of the virtual paths multiplexed with the another optical path back to the optical paths 160 through 162.

The network management system 170 manages virtual path identifiers for the virtual paths and wavelengths that are currently used for the transmission paths 150 through 152. The network management system 170 notifies the network nodes 100, 110, 120, and 130 of a wavelength to be used for the optical path and the virtual path identifier, as parameters, according to the switch request signal from the node control units 104, 114, 124, and 134. The network management system 170 notifies the network nodes 100, 110, 120, and 130, of the virtual path identifier, as a parameter, according to the inverse switch request signal from the node control units 104, 114, 124, and 134.

The node control units 104, 114, 124, and 134 receive the above-mentioned parameters from the network management system that are necessary for establishing/releasing the virtual and optical paths. The node control units 104, 114, 124, and 134 control the virtual path switch 101 and the optical path switch 102, the virtual path switch 111 and the optical path switch 112, the virtual path switch 121 and the optical path switch 122, and the virtual path switch 131 and the optical path switch 132, respectively. In addition, the node control units 104, 114, 124, and 134 multiplex predetermined virtual paths into a predetermined optical path or demultiplex predetermined virtual paths from a predetermined optical path.

Referring to FIGS. 4 through 7, operation of the electro/optical combined type network node control system according to the first embodiment of the present invention is described. The same reference numerals as in FIG. 3 depicts the same components and parts. For convenience, the virtual path switched from the network connected to the local network node to the local network node, or the virtual path switched from the local network node to the network connected to the local network node are referred to as a drop virtual path. On the contrary, the virtual path from the adjacent network node to the remote network node via the local network node is referred to as the through virtual path.

Whether a certain virtual path serves as the drop virtual path or the through virtual path depends where in the network the network node considered is located. The same virtual path may be called both the drop virtual path and the through virtual path depending on the network node considered. For this reason, they are called merely as the virtual path(s) except that it is apparent the path is the through virtual path.

Figure 4:
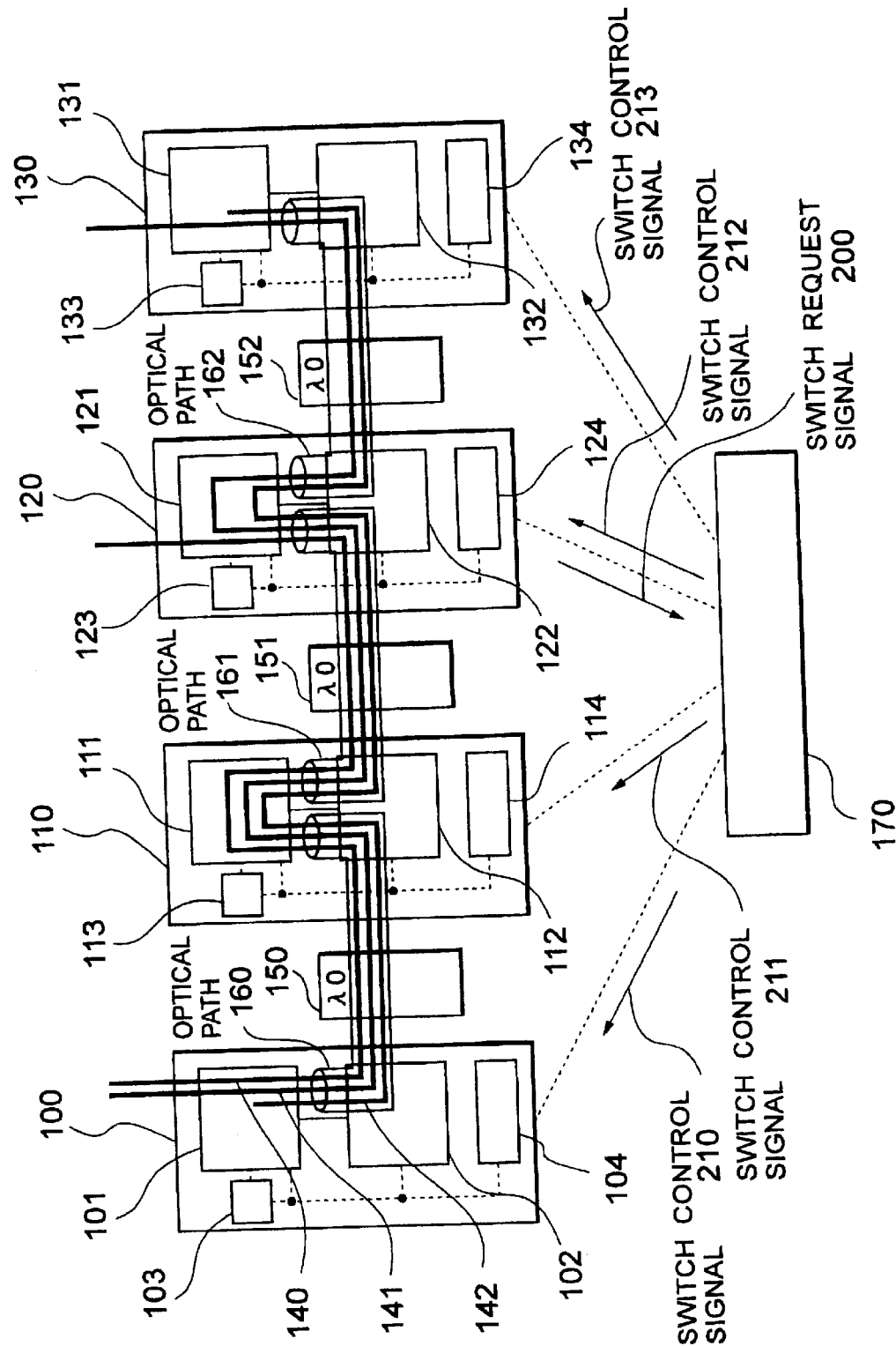
FIG. 4 is a view for use in describing operation of the electro/optical combined type network node control system according to the first embodiment of the present invention.

As shown in FIG. 4, the virtual path 140 is transferred among the network nodes 100, 110, and 120 on the optical paths 160 and 161 with the wavelength $\lambda 0$. The through virtual paths 141 and 142 are transferred among the network nodes 100, 110, 120, and 130 on the optical paths 160 through 162 with the wavelength $\lambda 0$.

The virtual path 140 is switched into the optical paths 160 and 161 by the virtual path switches 101, 111, and 121. The virtual paths 141 and 142 are switched into the optical paths 160, 161, and 162 by the virtual path switches 101, 111, 121, and 131. The virtual path monitor unit 103, 113, 123, and 133 measure the amount of traffic across the virtual paths 140, 141, and 142. The network nodes 100, 110, 120, and 130 produce the switch request signal to the network management system 170, depending on the amount of traffic across the virtual paths 140 through 142. More specifically, a switch request signal 200 is supplied to the network management system 170 when the amount of traffic across the virtual paths 140 through 142 exceeds a predetermined threshold value. In the example shown in FIG. 4, the network node 120 supplies the switch request signal 200 to the network management system 170.

The network management system 170 searches for, in response to the switch request signal 200, a wavelength that is not used for the transmission paths 150 through 152, in order to switch the virtual paths 140 through 142 into an optical path with a wavelength that is different from the wavelength $\lambda 0$. The network management system 170 also searches for a virtual path identifier that is to be used to transfer the virtual paths 140 through 142 on the optical path with the wavelength other than $\lambda 0$.

Figure 5:
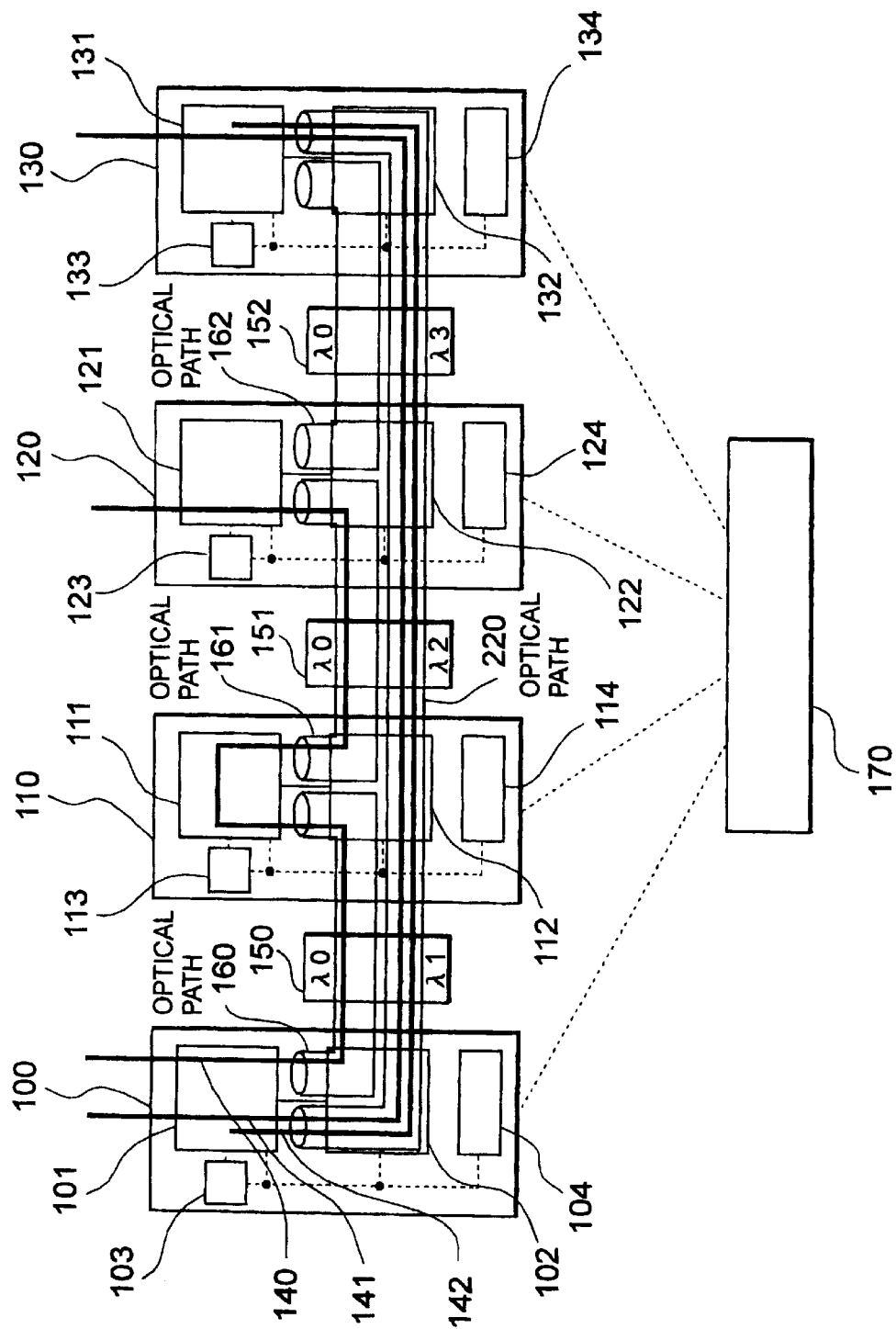
FIG. 5 is a view for use in describing operation of the electro/optical combined type network node control system according to the first embodiment of the present invention.

In the illustrative embodiment, an alternate optical path 220 is established to directly transfer the through virtual paths 141 and 142 that pass through the network node 120, from the network node 100 to the network node 130, as shown in FIG. 5. The network management system 170 searches for the wavelength required to establish the optical path 220 for each of the transmission paths 150 through 152.

The network management system 170 further searches for the virtual path identifier that is to be used to transfer the through virtual paths 141 and 142 on the new optical path 220. After searching, the network management system 170 notifies, by means of a switch control signal 210, the network node 100 that the wavelength of $\lambda 1$ is to be used for the transmission path 150 on the optical path 220. The network management system 170 notifies, by means of a switch control signal 211, the network node 110 that the wavelengths of $\lambda 1$ and $\lambda 2$ are to be used for the transmission paths 150 and 151, respectively. Likewise, the network management system 170 notifies, by means of a switch control signal 212, the network node 120 that the wavelengths of $\lambda 2$ and $\lambda 3$ are to be used for the transmission paths 151 and 152, respectively. The network management system 170 notifies, by means of a switch control signal 213, the network node 130 that the wavelength of $\lambda 3$ is to be used for the transmission path 152.

The network management system 170 also notifies the network nodes 100 and 130 that terminate the optical path 220 of the virtual path identifiers that are to be used for the transfer of the through virtual path 141 and 142 on the optical path 220.

Next, as shown in FIG. 5, the network nodes 100, 110, 120, and 130 controls, in response to the reception of the switch request signals, the optical path switches 102, 112, 122, and 132, respectively, to establish the optical path 220. The virtual path switch 101 switches the through virtual paths 141 and 142 from the optical path 160 to the optical path 220. The virtual path switch 131 switches the through virtual path 141 and 142 from the optical path 162 to the optical path 220.

As a result, the virtual path identifiers for the through virtual paths 141 and 142 are changed into values that are used during their transfer on the optical path 220 by means of controlling the virtual path switch 101. Then, the virtual path switch 101 multiplexes the through virtual paths 141 and 142 into the optical path 220. An optical signal with the wavelength $\lambda 1$ is transmitted from the network node 100 to the network node 110 by means of controlling the optical path switch 102.

Next, the optical signal with the wavelength $\lambda 1$ from the network node 100 is converted into an optical signal with the wavelength $\lambda 2$ by means of controlling the optical path switch 112. The converted signal is then transmitted to the network node 110. The optical signal with the wavelength $\lambda 2$ from the network node 110 is converted into an optical signal with the wavelength $\lambda 3$ by means of controlling the optical path switch 122. The converted signal is then transmitted to the network node 120. The optical signal with the wavelength $\lambda 3$ from the network node 120 is then transmitted to the network node 130 by means of controlling the optical path switch 132.

For the transfer in the opposite direction, the virtual path identifiers for the through virtual paths 141 and 142 are changed into values that are to be used during their transfer on the optical path 220 by means of controlling the virtual path switch 131. Subsequently, the virtual path switch 131 multiplexes the through virtual paths 141 and 142 with the optical path 220. Then, the optical signal with the wavelength $\lambda 3$ is transmitted to the network node 120 by means of controlling the optical path switch 132. Next, the optical signal with the wavelength $\lambda 3$ from the network node 130 is converted into the optical signal with the wavelength $\lambda 2$ by means of controlling the optical path switch 122. The converted signal is then transmitted to the network node 120. The optical signal with the wavelength $\lambda 2$ from the network node 120 is converted into an optical signal with the wavelength $\lambda 1$ by means of controlling the optical path switch 112. The converted signal is then transmitted to the network node 110. The optical signal with the wavelength $\lambda 1$ from the network node 110 is then transmitted to the network node 100 by means of controlling the optical path switch 102.

In the manner described above, the alternate optical path is established between the certain network nodes depending on the amount of the traffic across the virtual paths. Switching of the virtual paths in the network nodes can be eliminated and the plurality of the optical paths and wavelengths required can be reduced by means of transferring the virtual paths to be multiplexed into the optical paths 160, 161, and 162 determined previously for the respective transmission paths.

Figure 6:
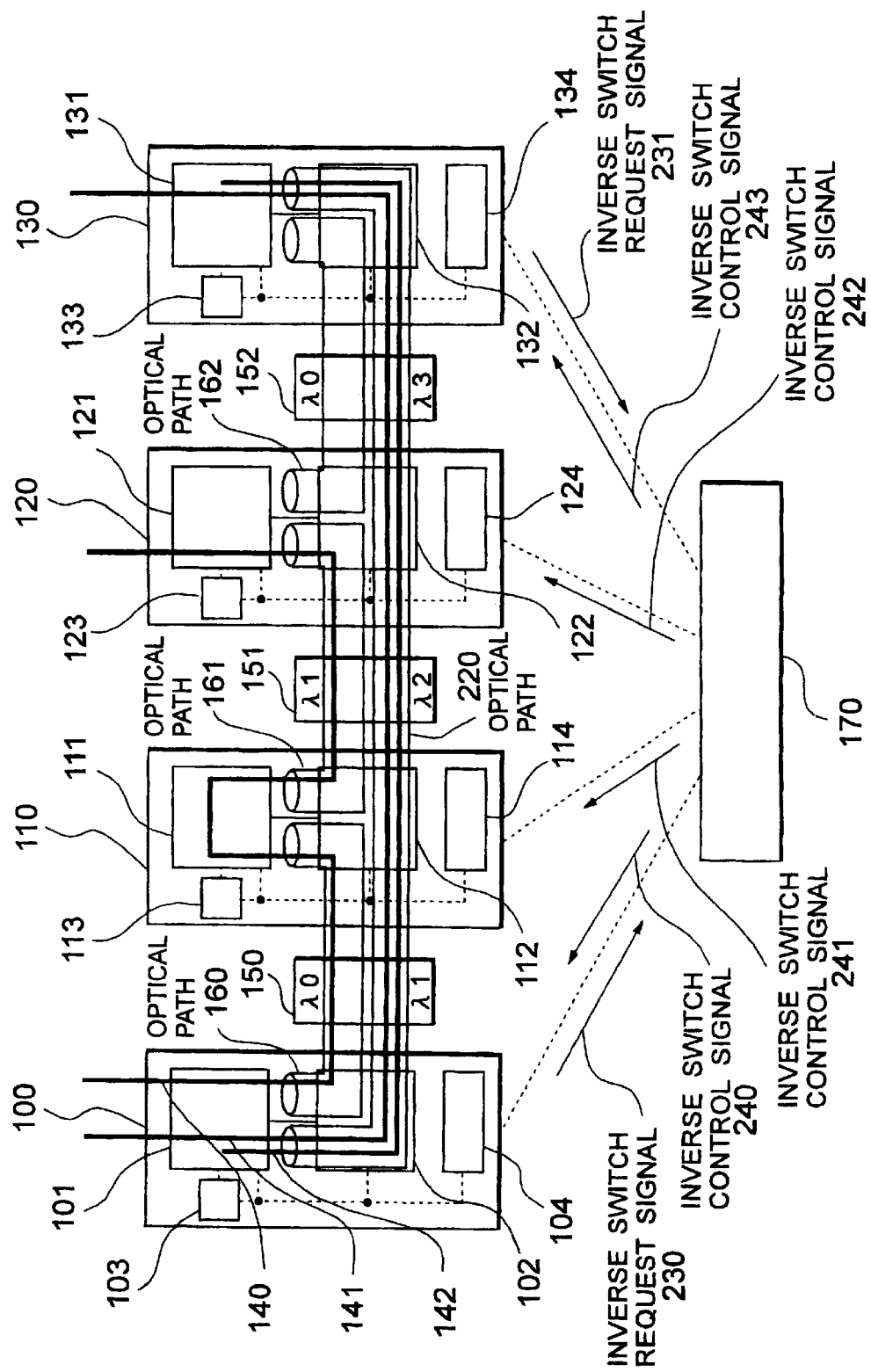
FIG. 6 is a view for use in describing operation of the electro/optical combined type network node control system according to the first embodiment of the present invention.
Figure 7:
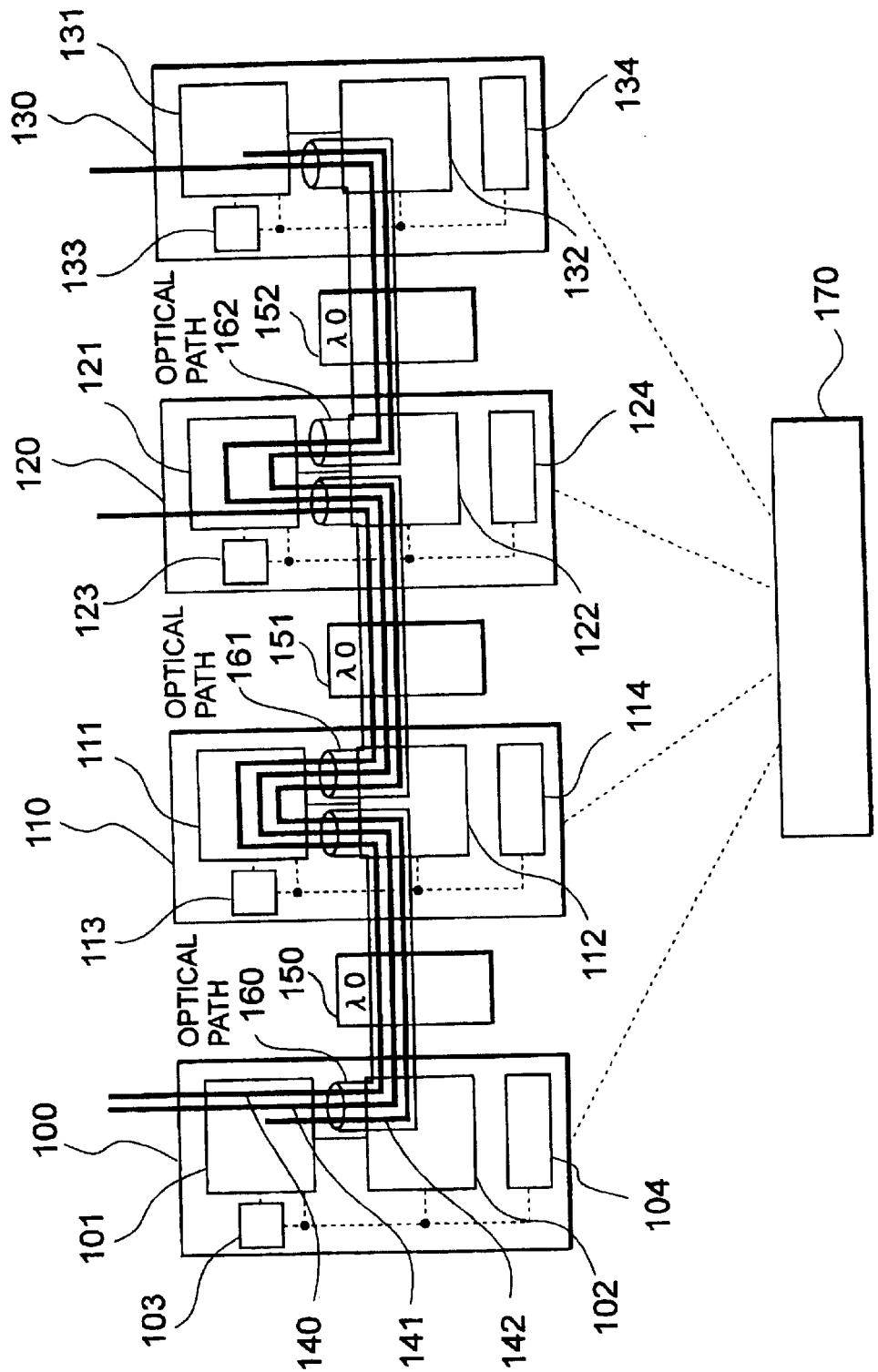
FIG. 7 is a view for use in describing operation of the electro/optical combined type network node control system according to the first embodiment of the present invention.

Referring to FIGS. 6 and 7, inverse switching of the virtual paths 141 and 142 from the optical path 220 to the optical paths 160 through 162 is described. The virtual path monitor units 103 and 133 measure the amount of traffic across the virtual paths 141 and 142, respectively. The network nodes 100 and 130 that terminate the optical path 220 supply inverse switch request a signal to the network management system 170 depending on the amount of traffic across the virtual paths 141 and 142. More specifically, an inverse switch request signal 230 is supplied to the network management system 170 when the amount of traffic across the virtual path 141 is not larger than a predetermined threshold value. Likewise, an inverse switch request signal 231 is supplied for the virtual path 142. The network management system 170 searches for, in response to the inverse switch request signal 230 or 231, a virtual path identifier that is to be used by the virtual paths 141 or 142, respectively, for the optical paths 160 through 162 with the wavelength λ0.

After searching, the network management system 170 notifies, by means of an inverse switch control signal 240, the network node 100 of the virtual path identifier to be used for the transfer by the virtual paths 141 and 142 on the optical path 160. The network management system 170 notifies, by means of an inverse switch control signal 241, the network node 110 of the virtual path identifier to be used for the transfer by the virtual paths 141 and 142 on the optical paths 160 and 161. Likewise, the network management system 170 notifies, by means of an inverse switch control signal 242, the network node 120 of the virtual path identifier to be used for the transfer by the virtual paths 141 and 142 on the optical paths 161 and 162. The network management system 170 notifies, by means of an inverse switch control signal 243, the network node 130 of the virtual path identifier to be used for the transfer by the virtual paths 141 and 142 on the optical path 162.

As shown in FIG. 7, the network nodes 100, 110, 120, and 130 controls the optical path switches 102, 112, 122, and 132, respectively, in response to the inverse switch control signal, to release the optical path 220. The network nodes 100 and 130 execute inverse switching of the virtual paths 141 and 142 from the optical path 220 to the optical paths 160 through 162 by means of the virtual path switches 101 and 131, respectively.

As a result, in the network node 100, the virtual path switch 101 changes the virtual path identifiers for the virtual paths 141 and 142 into values that are used for the transfer on the optical path 160. The virtual path switch 101 then multiplexes the virtual paths 141 and 142 into the optical path 160. The optical signal with the wavelength λ0 is transmitted to the network node 110 by means of controlling the optical path switch 102.

Next, the network node 110 receives the optical signal with the wavelength λ0 from the network node 100 by means of controlling the optical path switch 112. The virtual path switch 111 changes the virtual path identifiers for the through virtual paths 141 and 142 from the value used for the optical path 160 to a value to be used for the optical path 161. The virtual path switch 111 then multiplexes the virtual paths 141 and 142 with the optical path 161. The optical signal with the wavelength λ0 is transmitted to the network node 120 by means of controlling the optical path switch 112.

The network node 120 receives the optical signal with the wavelength λ0 from the network node 110 by means of controlling the optical path switch 122. The virtual path switch 121 changes the virtual path identifiers for the through virtual paths 141 and 142 from the value used for the optical path 161 to a value to be used for the optical path 162. The virtual path switch 121 then multiplexes the through virtual paths 141 and 142 into the optical path 162. The optical signal with the wavelength λ0 is transmitted to the network node 130 by means of controlling the optical path switch 122. The network node 130 receives the optical signal with the wavelength λ0 from the network node 120 by means of controlling the optical path switch 132. The network node 130 receives the virtual paths 141 and 142 by means of the virtual path switch 131.

For the transfer in the opposite direction, the virtual path switch 131 changes the virtual path identifiers for the through virtual paths 141 and 142 into values that are to be used during their transfer on the optical path 162. Subsequently, the virtual path switch 131 multiplexes the virtual paths 141 and 142 with the optical path 162. Then, the optical signal with the wavelength λ0 is transmitted from the network node 130 to the network node 120 by means of controlling the optical path switch 132.

Next, the network node 120 receives the optical signal with the wavelength λ0 from the network node 130 by means of controlling the optical path switch 122. The virtual path switch 121 changes the virtual path identifiers for the through virtual paths 141 and 142 from the value used for the optical path 162 to a value to be used for the optical path 161. The virtual path switch 121 then multiplexes the through virtual paths 141 and 142 into the optical path 161. The optical signal with the wavelength λ0 is transmitted from the network node 120 to the network node 110 by means of controlling the optical path switch 122.

Subsequently, the network node 110 receives the optical signal with the wavelength λ0 from the network node 120 by means of controlling the optical path switch 112. The virtual path switch 111 changes the virtual path identifiers for the through virtual paths 141 and 142 from the value used for the optical path 161 to a value to be used for the optical path 160. The virtual path switch 111 then multiplexes the through virtual paths 141 and 142 with the optical path 160. The optical signal with the wavelength λ0 is transmitted from the network node 110 to the network node 100 by means of controlling the optical path switch 112. The network node 100 receives the optical signal with the wavelength λ0 from the network node 110 by means of controlling the optical path switch 102. Then, the network node 100 receives the virtual paths 141 and 142 by means of the virtual path switch 101.

In the manner described above, the virtual paths transferred on the alternate optical path that is established among the certain network nodes can be inverse switched to the optical path predetermined for the individual transmission paths, depending on the amount of the traffic across the virtual paths.

Figure 8:
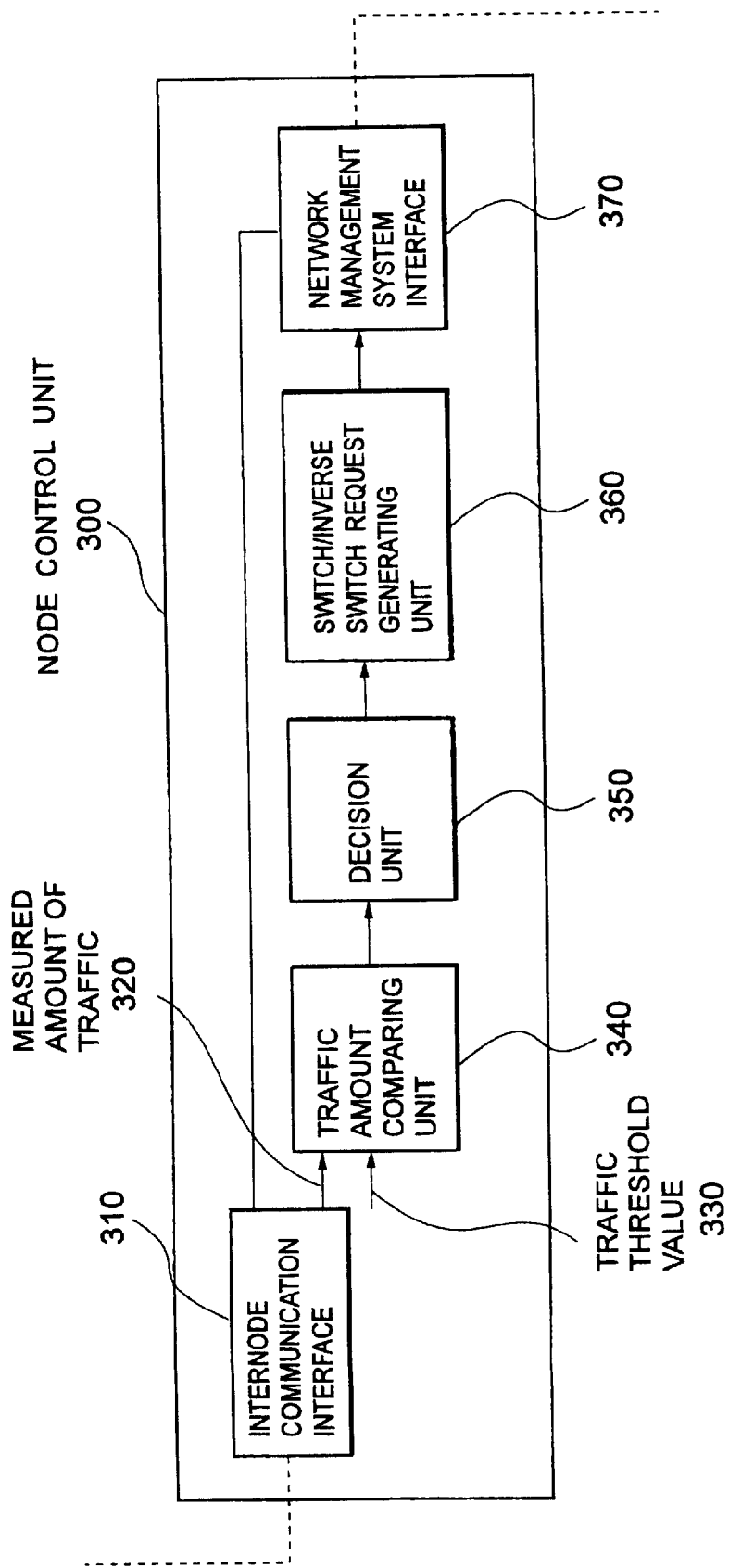
FIG. 8 is a view for use in describing operation of a node control unit illustrated in FIG. 3.

Referring to FIG. 8, operation is described for the node control units 104, 114, 124, and 134 according to the first embodiment of the present invention. A node control unit 300 indicates details of the node control units 104, 114, 124, and 134 in the network node 100, 110, 120, and 130, respectively.

The monitoring results on the amount of traffic across the virtual paths are notified by the virtual path monitor units 103, 113, 123, and 133. A measured amount 320 of the traffic across the virtual paths is supplied to a traffic amount comparing unit 340 via a internode communication interface 310. A traffic threshold value 330 for the amount of traffic for the individual virtual paths is previously stored in the traffic amount comparing unit 340.

For establishing an alternate optical path, the traffic amount comparing unit 340 compares the measured amount 320 of the traffic with the traffic threshold value 330 for the amount of traffic for the individual virtual paths. The traffic amount comparing unit 340 then issues or notifies a decision unit 350 of the result of comparison. In response to the comparison result from the traffic amount comparing unit 340, the decision unit 350 determines the virtual path(s) on the optical path that is/are having the traffic larger than the traffic threshold value 330. The decision unit 350 then decides to switch that virtual path(s) into the alternate optical path established. The decision unit 350 notifies a switch/inverse switch request signal generating unit 360 of the decision result.

More specifically, as apparent from FIGS. 6 and 8, the traffic amount comparing unit 340 is supplied with the measured amount 320 for the three traffics across the virtual paths 140 through 142, respectively, that are transferred on the optical paths 160 through 162. The traffic amount comparing unit 340 compares these three measured amounts 320 with the traffic threshold value 330 for each of the virtual path. The traffic amount comparing unit 340 then notifies the decision unit 350 of the three comparing results. The decision unit 350 determines the virtual paths 141 and 142 on the optical paths 160 through 162 that are having the traffic larger than the traffic threshold value 330. The decision unit 350 then decides to switch that virtual paths 141 and 142 into the alternate optical path 220 established. The decision unit 350 notifies the switch/inverse switch request signal generating unit 360 of the decision result.

For the inverse switching of the alternate optical path, the decision unit 350 determines the virtual path(s) on the optical path that is/are having the traffic not larger than the traffic threshold value 330. The decision unit 350 then decides to inverse multiplex that virtual path(s) into the optical path established for the transmission path with the wavelength λ0. The decision unit 350 notifies the decision result to the switch/inverse switch request signal generating unit 360.

More specifically, as apparent from FIGS. 6 and 8, the decision unit 350 determines the virtual paths 141 and 142 on the optical path 220 that has the amount of traffic not larger than the traffic threshold value 330. The decision unit 350 then decides to inverse multiplex that virtual paths 141 and 142 into the optical paths 160 through 162 established for the transmission path with the wavelength λ0. The decision unit 350 notifies the switch/inverse switch request signal generating unit 360 of the decision result.

The switch/inverse switch request signal generating unit 360 generates the switch request signal 200 or the inverse switch request signals 230 and 231, depending on the decision result from the decision unit 350. The switch request signal 200 or the inverse switch request signals 230 and 231 are supplied to the network management system 170 via a network management system interface 370.

The switch control signals 210 through 213 and the inverse switch control signal 240 through 243 from the network management system 170 are supplied to the network management system interface 370. The switch control signals 210 through 213 are converted into switching control signals at the network management system interface 370. The switching control signals are then transmitted to the optical path switches 102, 112, 122, and 132 via the internode communication interface 310. The switch control signals 210 through 213 transmitted from the optical path switches are supplied to the virtual path switches 101, 111, 121, and 131, respectively. Likewise, the inverse switch control signals 240 through 243 are converted into switching control signals at the network management system interface 370 and supplied to the optical path switches 102, 112, 122, and 132 via the internode communication interface 310. The inverse switch control signals 240 through 243 supplied from the optical path switches are then transmitted to the virtual path switches 101, 111, 121, and 131, respectively. This allows switching of the virtual paths 141 and 142 between the optical paths 160 through 162 and the optical path 220.

Figure 9:
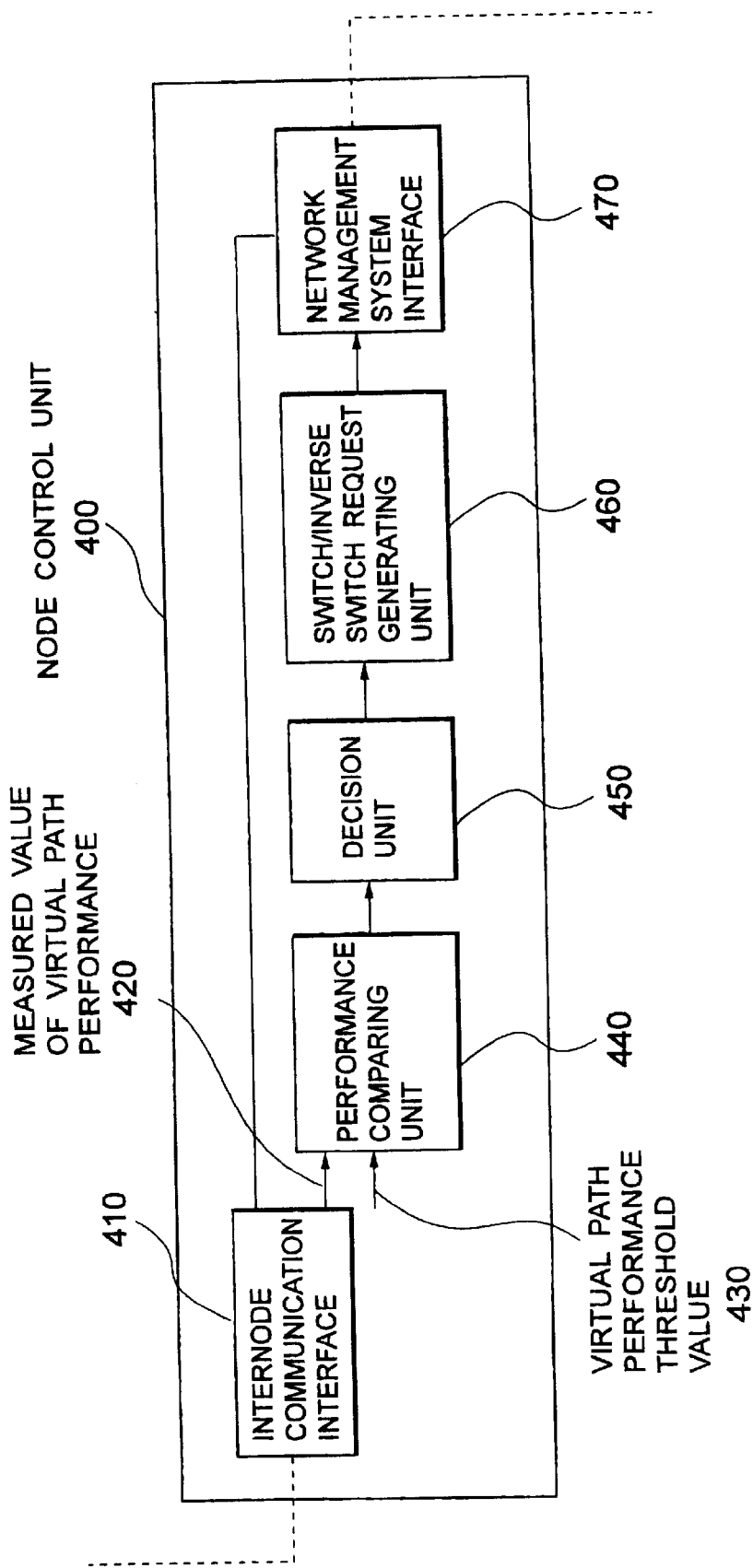
FIG. 9 is a view for use in describing different operation of the node control unit illustrated in FIG. 3.

Referring to FIG. 9, another operation is described for the node control units 104, 114, 124, and 134 according to the first embodiment of the present invention. A node control unit 400 indicates details of the node control units 104, 114, 124, and 134 in FIG. 3. The virtual path monitor units 103, 113, 123, and 133 measure performance data for the individual virtual paths. The performance data are supplied to a performance comparing unit 440 via an internode communication interface 410.

For the network nodes 100, 110, 120, and 130, a virtual path performance threshold value 430 is previously stored in the respective performance comparing unit 440 for every virtual path. In response to the performance data, the performance comparing unit 440 compares a measured value of virtual path performanve 420 with the virtual path performance threshold value 430 for every virtual path. The performance comparing unit 440 notifies a decision unit 450 of the result of comparison.

For establishing an alternate optical path, the decision unit 450 operates as follows in response to the comparing result from the performance comparing unit 440. If there is a virtual path having the measured value of virtual path performance 420 that is larger than the virtual path performance threshold value 430, the decision unit 450 notifies a switch/inverse switch request signal generating unit 460 of the decision result indicating that the virtual path in question should be switched into the alternate optical path.

For the inverse switching of the alternate optical path, the decision unit 450 operates as follows in response to the comparison result from the performance comparing unit 440. If there is a virtual path having the performance data that is not larger than the cirtual path performance threshold value 430, the decision unit 450 notifies the switch/inverse switch request signal generating unit 460 of the decision result indicating that the virtual path in question should be inverse switched into the optical paths 160 through 162 established for the individual transmission paths.

The switch/inverse switch request signal generating unit 460 generates a switch request signal or an inverse switch request signal in response to the decision result as described above. The switch and inverse switch request signal generating unit 460 then transmits these signals to the network management system 170 via a network management system interface 470.

Similar processing is made for the switch control signals 210 through 213 and the inverse switch control signals 240 through 243 to the case for the measurement of the traffic amount. This allows switching of the virtual paths 141 and 142 between the optical paths 160 through 162 and the optical path 220 as in the case shown in FIG. 8.

Specific factors for the performance data for the virtual paths include, for example, a cell loss factor for the individual virtual paths, a cell delay time, and a bit error rate. Specifications on the performance of virtual paths are described in, for example, "P-ISDN Operation and Maintenance Principles and Functions", ITU-T Recommendation, I.610.

Figure 10:
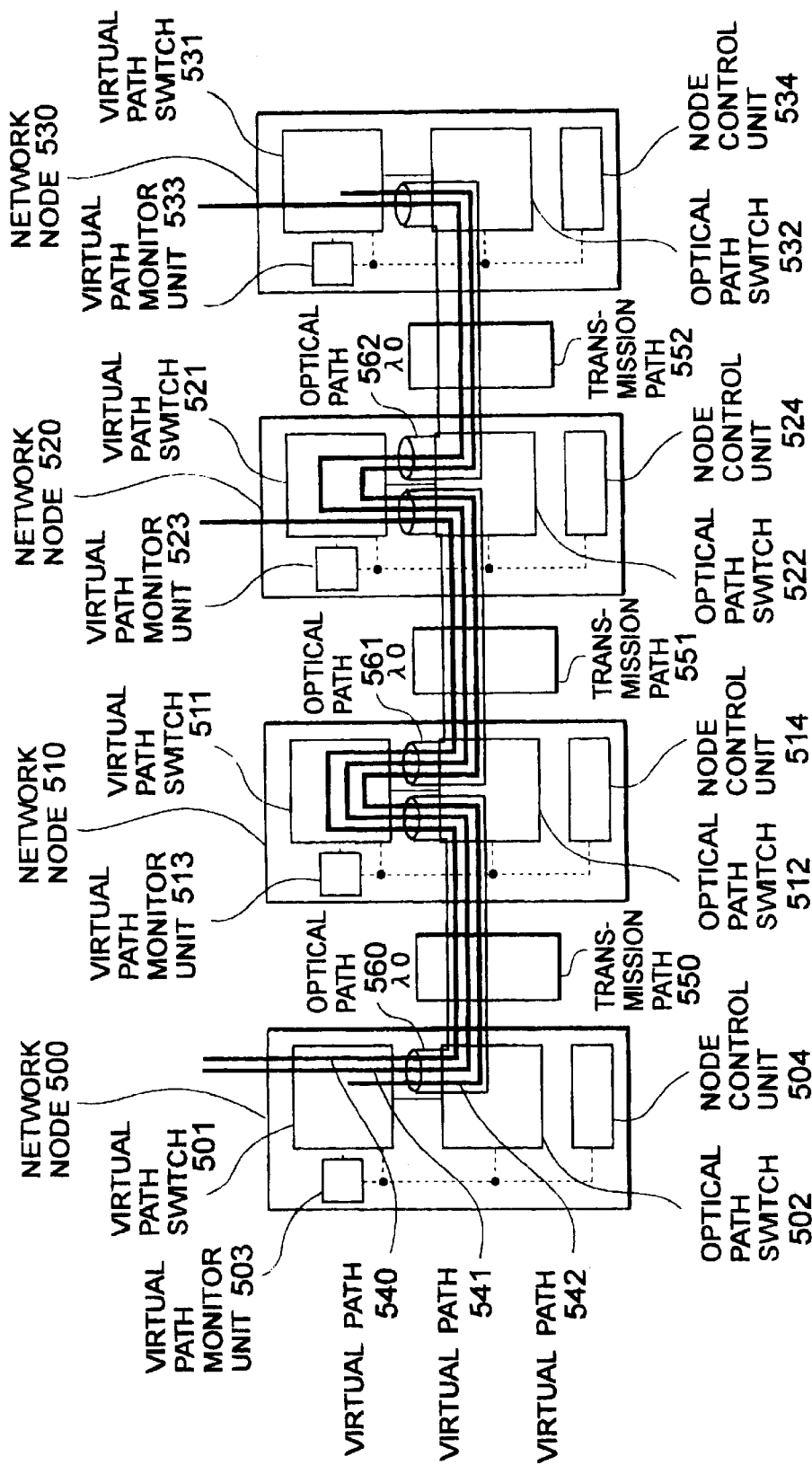
FIG. 10 is a view for use in describing a transport network implementing an electro/optical combined type network node control system according to a second embodiment of the present invention.

Referring to FIG. 10, an electro/optical combined type network node control system according to a second embodiment of the present invention is described. FIG. 10 shows a transport network to which the electro/optical combined type network node control system of the second embodiment can be applied. In FIG. 10, the transport network comprises network nodes 500, 510, 520, and 530.

The network node 500 has a virtual path switch 501, an optical path switch 502, a virtual path monitor unit 503, and a node control unit 504. The network node 510 has a virtual path switch 511, an optical path switch 512, a virtual path monitor unit 513, and a node control unit 514. The network node 520 has a virtual path switch 521, an optical path switch 522, a virtual path monitor unit 523, and a node control unit 524. The network node 530 is formed of a virtual path switch 531, an optical path switch 532, a virtual path monitor unit 533, and a node control unit 534.

The network nodes 500 and 510 are connected to each other via a bi-directional transmission path 550. The network nodes 510 and 520 are connected to each other via a bi-directional transmission path 551. The network nodes 520 and 510 are connected to each other via a bi-directional transmission path 552. A bi-directional optical path 560 having a wavelength $\lambda 0$ is previously established between the network nodes 500 and 510. A bi-directional optical path 561 having a wavelength $\lambda 1$ is previously established between the network nodes 510 and 520. A bi-directional optical path 562 having a wavelength $\lambda 2$ is previously established between the network nodes 520 and 530. A bi-directional virtual path 540 is transferred from the network node 500 to the network node 520. Bi-directional virtual paths 541 and 542 are transferred from the network nodes 500 to the network node 530 via the network nodes 510 and 520.

The network nodes 500, 510, 520, and 530 are connected to a network (not shown) such as an area network, a subscriber's access network, or a local area network. The network nodes switch the virtual path from the network connected to the local network node or switch the virtual path terminated by the local network node. The network nodes also switch the virtual path from a remote network node to the network connected to the local network node or terminate that virtual path.

The network nodes 500 and 510 that terminate the optical path 560 "map" the virtual and optical paths. Likewise, the network nodes 510 and 520 that terminate the optical path 561 map the virtual and optical paths. The network nodes 520 and 530 that terminate the optical path 562 map the virtual and optical paths. The virtual path switch 501 multiplexes the virtual paths 540 and 541 from the network connected to the network node 500 with the virtual path 542 terminated by the network node 500 and the optical path 560 into the wavelength $\lambda 0$.

The optical path switch 502 transfers the optical path 560 with the wavelength $\lambda 0$ through the transmission path 550 to the network node 510. The optical path switch 502 switches the optical path 560 with the wavelength $\lambda 0$ from the network node 510 transferred through the transmission path 550 into the virtual path switch 501. The virtual path switch 501 demultiplexes the virtual paths 540 through 542 from the optical path 560 with the wavelength $\lambda 0$, transfers the virtual paths 540 and 541 to the network connected to the network node 500 while terminates the virtual path 542.

For the network node 510, the optical path switch 512 switches the optical path 560 with the wavelength $\lambda 0$ from the network node 500 to the virtual path switch 511. The virtual path switch 511 demultiplexes the virtual paths 540 through 542 from the optical path 560 with the wavelength $\lambda 0$ and multiplexes them into the optical path 561 with the wavelength $\lambda 0$. The optical path switch 512 transfers the optical path 561 with the wavelength $\lambda 0$ through the transmission path 551 to the network node 520.

In addition, for the network node 510, the optical path switch 512 switches the optical path 561 with the wavelength $\lambda 0$ from the network node 520 to the virtual path switch 511. The virtual path switch 511 demultiplexes the virtual paths 540 through 542 from the optical path 561 with the wavelength $\lambda 0$ and multiplexes them again into the optical path 560 with the wavelength $\lambda 0$. The optical path switch 512 transfers the optical path 560 with the wavelength $\lambda 0$ to the network node 510 via the transmission path 550.

For the network node 520, the optical path switch 522 switches the optical path 561 with the wavelength $\lambda 0$, that is transferred via the transmission path 551 from the network node 510, to the virtual path switch 521. The virtual path switch 521 demultiplexes the virtual paths 540 through 542 from the optical path 561 with the wavelength $\lambda 0$. The virtual path switch 521 transfers the virtual path 540 to the network connected to the network node 520 and multiplexes the virtual paths 541 and 542 again into the optical path 562 with the wavelength $\lambda 0$.

For the network node 520, the optical path switch 522 transfers the optical path 562 with the wavelength $\lambda 0$ to the network node 530 via the transmission path 552. The optical path switch 522 switches the optical path 562 with the wavelength $\lambda 0$ from the network node 530 to the virtual path switch 521. The virtual path switch 521 demultiplexes the virtual paths 541 and 542 from the optical path 562 with the wavelength $\lambda 0$. The virtual path switch 521 multiplexes the virtual path 540 from the network connected to the network node 520 as well as the virtual paths 541 and 542 again into the optical path 561 with the wavelength $\lambda 0$. Thereafter, the optical path switch 522 transfers the optical path 561 with the wavelength $\lambda 0$ to the network node 510 via the transmission path 551.

For the network node 530, the optical path switch 532 switches the optical path 562 with the wavelength $\lambda 0$ from the network node 520 to the virtual path switch 531. The virtual path switch 531 demultiplexes the virtual paths 541 and 542 from the optical path 562 with the wavelength $\lambda 0$. The virtual path switch 531 transfers the virtual path 541 to the network connected to the local network node 530 and terminates the virtual path 542.

For the network node 530, the virtual path switch 531 multiplexes the virtual path 541 from the network connected to the local network node 530 with the virtual path 542 terminated by the local network node 530 into the optical path 562 with the wavelength $\lambda 0$. The optical path switch 532 transfers the optical path 562 with the wavelength $\lambda 0$ to the network node 520 via the transmission path 552.

Virtual path monitor units 503, 513, 523, and 533 measure the amount of traffic on the virtual paths and notify node control units 504, 514, 524, and 534, respectively, of the result of measurements.

The node control units 504, 514, 524, and 534 are provided with the monitoring results from the virtual path monitor units 503, 513, 523, and 533, respectively. The node control units 504, 514, 524, and 534 exchange control signals among the network nodes 500, 510, 520, and 530 so as to switch the virtual paths multiplexed into the optical paths 560 through 562 with the wavelength $\lambda 0$ or to inverse switch the virtual paths multiplexed into the alternate optical path 620.

The node control units 504, 514, 524, and 534 manage the wavelengths and the virtual path identifiers for the virtual paths that are currently used for the transmission paths 550 through 552 between the adjacent network nodes. The node control units 504, 514, 524, and 534 manage the virtual path identifiers by means of controlling the corresponding virtual and optical path switches to multiplex and demultiplex a predetermined virtual path into and from the certain optical path.

Figure 11:
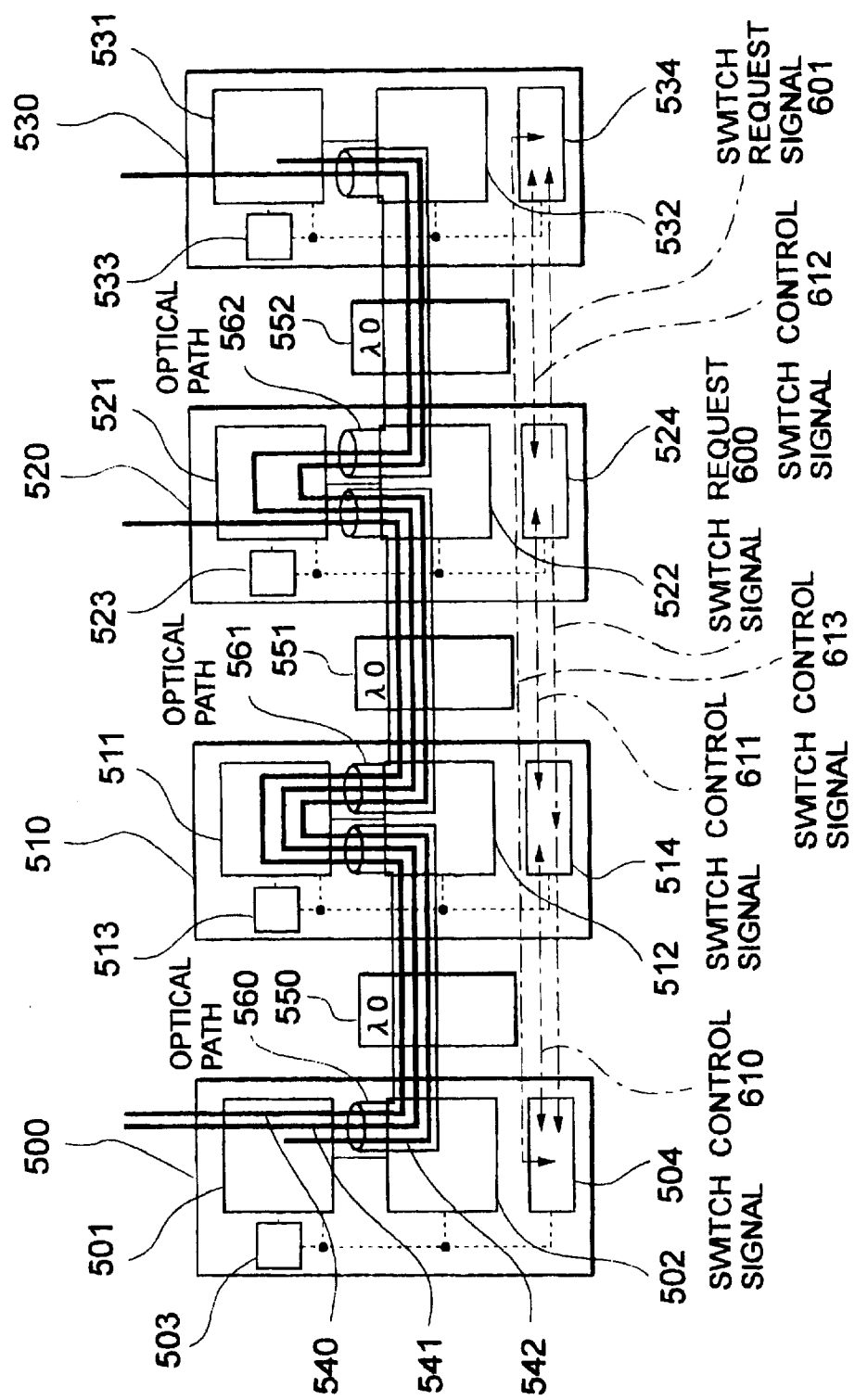
FIG. 11 is a view for use in describing operation of the electro/optical combined type network node control system according to the second embodiment of the present invention.

Referring to FIGS. 11 through 14, operation of the electro/optical combined type network node control system according to the second embodiment of the present invention is described. The same reference numerals as in FIG. 8 depicts the same components and parts. As shown in FIG. 11, the virtual path 540 is transferred on the optical paths 560 and 561 with the wavelength $\lambda 0$ among the network nodes 500, 510, and 520 for every link. The virtual paths 541 and 542 are transferred, for every link, on the optical paths 560 through 562 with the wavelength $\lambda 0$ among the network nodes 500, 510, 520, and 530.

The virtual path 540 is switched by the virtual path switches 501, 511, and 521. The virtual paths 541 and 542 are switched by the virtual path switches 501, 511, 521, and 531. The virtual path monitor units 503, 513, and 523 measure the amount of traffic across the corresponding virtual paths 540 through 542. The virtual path monitor unit 533 measure the amount of traffic across the corresponding virtual path 541 and 542. The network nodes 500, 510, 520, and 530 supply the switch request signal to the network nodes 500, 510, 520, and 530 depending on the amount of traffic across the virtual paths 540 through 542. The switch request signals are transferred on the optical paths 560 through 562 and relayed to the sending and receiving network nodes 500 and 530 for the virtual paths 541 and 542 via the trunk network nodes 510 and 520.

In this embodiment, the network node 520 supplies a switch request signal 600 to the network nodes 500 and 510. The network node 520 supplies a switch request signal 610 to the network node 530. In response to the switch request signals, the network nodes 500, 510, 520, and 530 searches for a wavelength that is different from those used for the transmission paths 550 through 552, in order to switch the virtual paths 540 through 542 into an alternate optical path with the wavelength other than $\lambda 0$. In addition, the network nodes 500, 510, 520, and 530 searches for the virtual path identifier to be used during transfer of the virtual paths 540 through 542 on the optical path with the wavelength other than $\lambda 0$.

Figure 12:
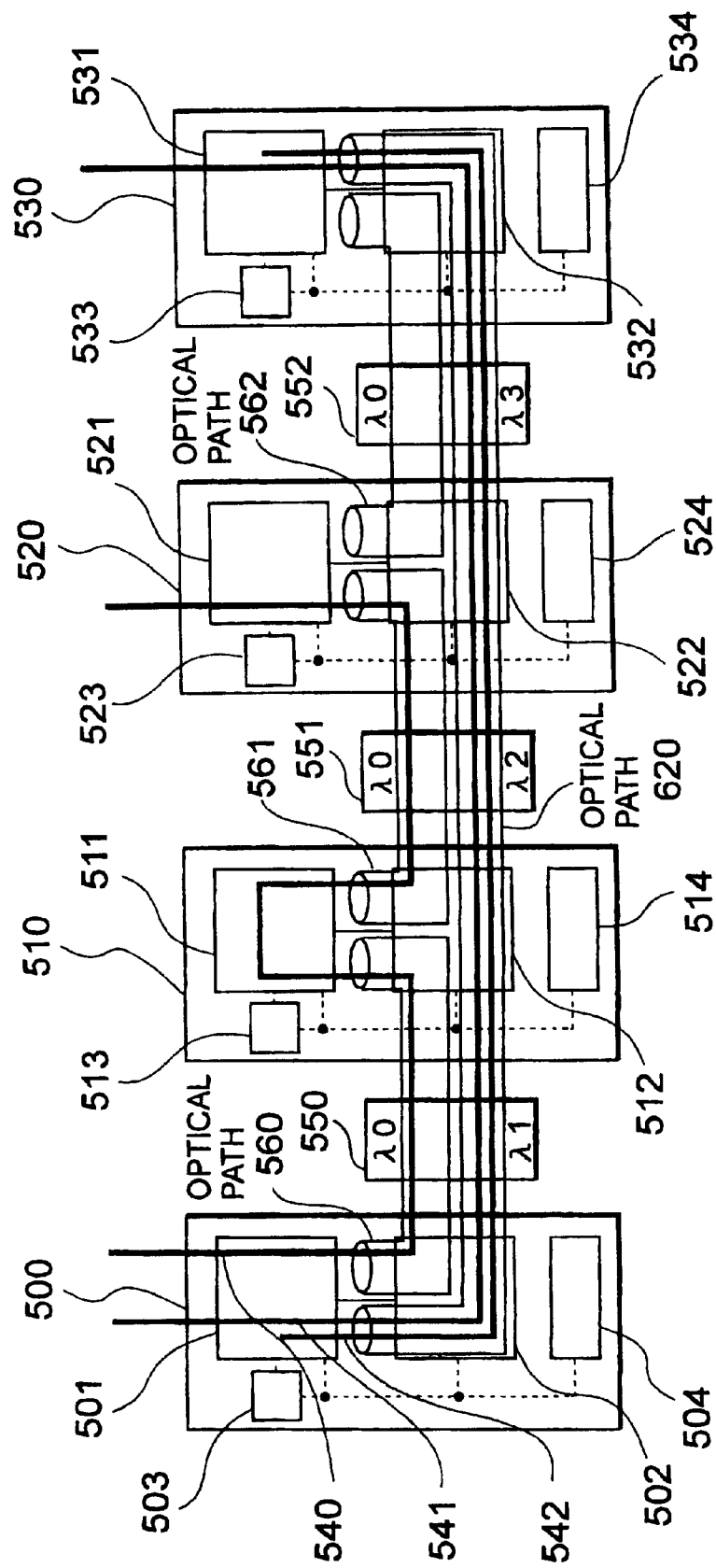
FIG. 12 is a view for use in describing operation of the electro/optical combined type network node control system according to the second embodiment of the present invention.

In the illustrative embodiment, the network node 500, 510, and 530 searches for, in response to the switch request signals 600 and 610 from the network node 520, the wavelengths required for the alternate optical path 620 for each of the transmission paths 550 through 552 to transfer the through virtual paths 541 and 542 directly between the network nodes 500 and 530. In FIG. 12, the sending network node 500 and the receiving network node 530 for the through virtual paths 541 and 542 search for the virtual path identifiers to be used during transfer of the virtual paths 541 and 542 on the optical path 620.

After searching of the virtual path identifiers, the network nodes 500 and 510 negotiate, by using the switch control signal 611, with the remaining nodes to determine the wavelength for the transmission path 550 used by the optical path 620. The network nodes 500 and 510 then allocate the wavelength $\lambda 2$ to the transmission path 551. Likewise, the network nodes 520 and 530 negotiate, by using the switch control signal 612, with the remaining nodes to determine the wavelength for the transmission path 552 used by the optical path 620. The network nodes 520 and 530 then allocate the wavelength $\lambda 3$ to the transmission path 552. The network nodes 500 and 530 negotiate, by using the switch control signal 613, with the remaining nodes to determine the wavelength used by the optical path 620.

Next, as shown in FIG. 12, the network nodes 500, 510, 520, and 530 control the optical path switches 502, 512, 522, and 532, respectively, to establish the optical path 620. The virtual path switch 501 switches the virtual paths 541 and 542 from the optical path 560 to the optical path 620. The virtual path switch 531 switches the virtual paths 541 and 542 from the optical path 562 to the alternate optical path 620. Then, the virtual path switch 501 changes the virtual path identifiers for the virtual paths 541 and 542 into values that are to be used during their transfer on the optical path 620 and multiplexes the virtual paths 541 and 542 into the optical paths 620. The network node 500 controls the optical path switch 502 to transfer the optical signal with the wavelength $\lambda 1$ to the network node 510.

The optical path switch 512 switches the optical signal with the wavelength $\lambda 1$ from the network node 500 into the optical signal with the wavelength $\lambda 2$ and transfers the optical signal with the wavelength $\lambda 2$ to the network node 520. The optical path switch 522 switches the optical signal with the wavelength $\lambda 2$ from the network node 500 into the optical signal with the wavelength $\lambda 3$ and transfers the optical signal with the wavelength $\lambda 3$ to the network node 530. The network node 530 receives the optical signal with the wavelength $\lambda 3$ from the network node 520 by means of controlling the optical path switch 532.

For the transfer in the opposite direction, the virtual path switch 531 changes the virtual path identifiers for the virtual paths 541 and 542 into values to be used during their transfer on the optical path 620. The virtual path switch 531 then multiplexes the virtual paths 541 and 542 into the optical path 620. The optical path switch 532 transfers the optical signal with the wavelength $\lambda 3$ to the network node 520. The optical path switch 522 switches the optical signal with the wavelength $\lambda 3$ from the network node 530 into the optical signal with the wavelength $\lambda 2$ and transfers it to the network node 510.

The optical path switch 512 switches the optical signal with the wavelength $\lambda 2$ from the network node 520 into the optical signal with the wavelength $\lambda 1$ and transfers it to the network node 500.

In the manner described above, according to the present invention, the alternate optical path can be established between the certain network nodes depending on the amount of traffic across the virtual paths and the virtual paths can be transferred on that alternate path, without using the network management system 170 described with reference to FIG. 3. Simplification of the switching operation is equally achieved as in the first embodiment.

Figure 13:
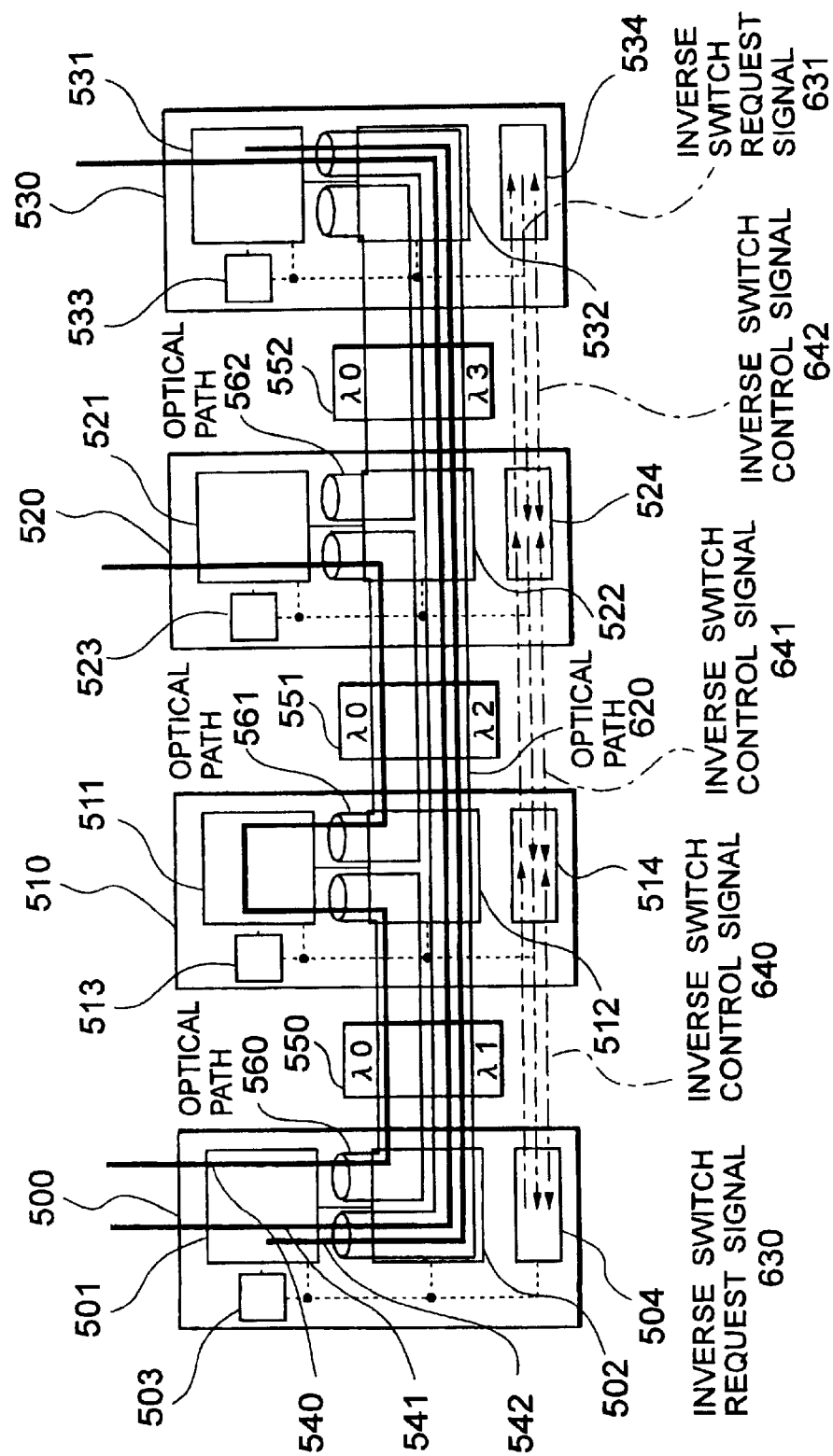
FIG. 13 is a view for use in describing operation of the electro/optical combined type network node control system according to the second embodiment of the present invention.
Figure 14:
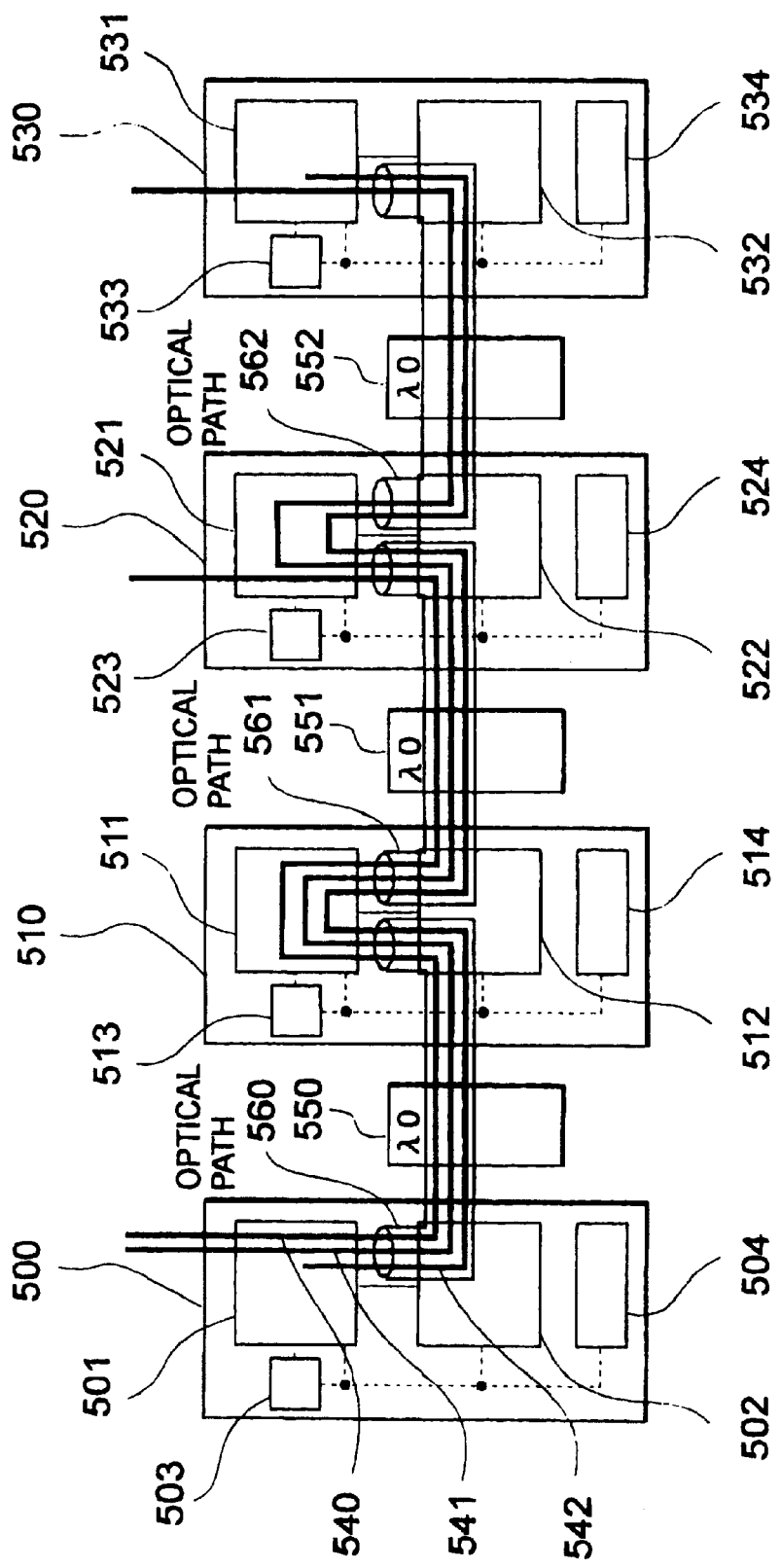
FIG. 14 is a view for use in describing operation of the electro/optical combined type network node control system according to the second embodiment of the present invention.

Referring to FIGS. 13 and 14, inverse switch of the virtual paths 541 and 542 from the optical path 620 to the optical paths 560 through 562 is described. The network nodes 500 and 530 that terminate the optical path 620 supply a signal to request inverse switch depending on the amount of traffic across the virtual paths 541 and 542, as shown in FIG. 13. An inverse switch request signal is supplied to the network nodes 500 and 530 at the terminals of the optical path 620 via the network nodes 510 and 520 by means of the optical paths 560 through 562.

In the embodiment shown in FIG. 13, the network node 500 supplies an inverse switch request signal 630 to the network node 530 located at the opposite end of the optical path 620. Likewise, the network node 530 supplies an inverse switch request signal 631 to the network node 500 located at the opposite of the optical path 620. The network nodes 500 through 530 search for, in response to the inverse switch request signals 630 and 631, the virtual path identifiers to be used for the optical paths 560 through 562 with the wavelength λ0 by the virtual paths 540 through 542.

After searching of the virtual path identifiers, the network nodes 500 and 510 negotiate, by using an inverse switch control signal 640, with the remaining nodes to determine the wavelength used by the optical path 560. The network nodes 500 and 510 then allocate that virtual path identifier to the transmission path 550. Likewise, the network nodes 510 and 520 negotiate, by using an inverse switch control signal 641, with the remaining nodes to determine the wavelength used by the optical path 561. The network nodes 510 and 520 then allocate that virtual path identifier to the transmission path 551. The network nodes 520 and 530 negotiate, by using an inverse switch control signal 642, with the remaining nodes to determine the wavelength used by the optical path 562. The network nodes 520 and 530 then allocate that virtual path identifier to the transmission path 552.

As shown in FIG. 14, the network nodes 500, 510, 520, and 530 control the optical path switches 502, 512, 522, and 532, respectively, to release the optical path 620. For the network nodes 500 and 530, the virtual path switches 501 and 531 inverse switch the virtual paths 541 and 542 from the optical path 620 into the optical paths 560 through 562. The virtual path switch 501 changes the virtual path identifiers for the virtual paths 541 and 542 into values that are to be used during their transfer on the optical path 560 and multiplexes the virtual paths 541 and 542 into the optical paths 560. The optical path switch 502 transfers the optical signal with the wavelength λ0 to the network node 510.

For the network node 510, the optical path switch 512 supplies the optical signal with the wavelength λ0 from the network node 500 to the virtual path switch 511. The virtual path switch 511 converts the virtual path identifiers for the through virtual paths 541 and 542 from the values used for the optical path 560 to the value to be used for the optical path 561. The virtual path switch 511 then multiplexes the through virtual paths 541 and 542 into the optical path 561. The optical path switch 502 transfers the optical signal with the wavelength λ0 to the network node 520. The optical path switch 522 transfers the optical signal with the wavelength λ0 from the network node 510 to the virtual path switch 521. The virtual path switch 521 converts the virtual path identifiers for the through virtual paths 541 and 542 from the value used for the optical path 561 to the value to be used for the optical path 562 and multiplexes the through virtual paths 541 and 542 again into the optical path 562. The optical path switch 522 transfers the optical signal with the wavelength λ0 to the network node 530.

The optical path switch 532 transfers the optical signal with the wavelength λ0 from the network node 520 to the virtual path switch 531. The virtual path switch 531 demultiplexes the through virtual paths 541 and 542 from the optical signal with the wavelength λ0 and sends them to a different network.

For the transfer in the opposite direction, in the network node 530, the virtual path switch 531 changes the virtual path identifiers for the virtual paths 541 and 542 into values to be used during their transfer on the optical path 562 and multiplexes the virtual paths 541 and 542 into the optical path 562. The optical path switch 532 supplies the optical signal with the wavelength 10 to the network node 520. In the network node 520, the optical path switch 522 supplies the optical signal with the wavelength 10 from the network node to the virtual path switch 521. The virtual path switch 521 converts the virtual path identifiers for the through virtual paths 541 and 542 from the value used for the optical path 562 into the value to be used for the optical path 561. The virtual path switch 521 then multiplexes the through virtual paths 541 and 542 into the optical path 561. The optical path switch 522 transfers the optical signal with the wavelength 10 to the network node 510.

For the network node 510, the optical path switch 512 supplies the optical signal with the wavelength 10 from the network node 520 to the virtual path switch 511. The virtual path switch 511 converts the virtual path identifiers for the virtual paths 541 and 542 from the value used for the optical path 561 into the value to be used for the optical path 560. The virtual path switch 511 multiplexes the through virtual paths 541 and 542 into the optical path 560. The optical path switch 512 transfers the optical signal with the wavelength 10 to the network node 500.

For the network node 500, the optical path switch 502 supplies the optical signal with the wavelength 10 from the network node 510 to the virtual path switch 501. The virtual path switch 501 supplies the virtual paths 541 and 542 to another network. According to the above-mentioned configuration, it is possible to inverse switch the alternate optical path established between the certain network node into the optical paths previously established for each transmission path depending on the amount of traffic across the virtual paths, without using the network management system 170 described in conjunction with FIG. 3.

Figure 15:
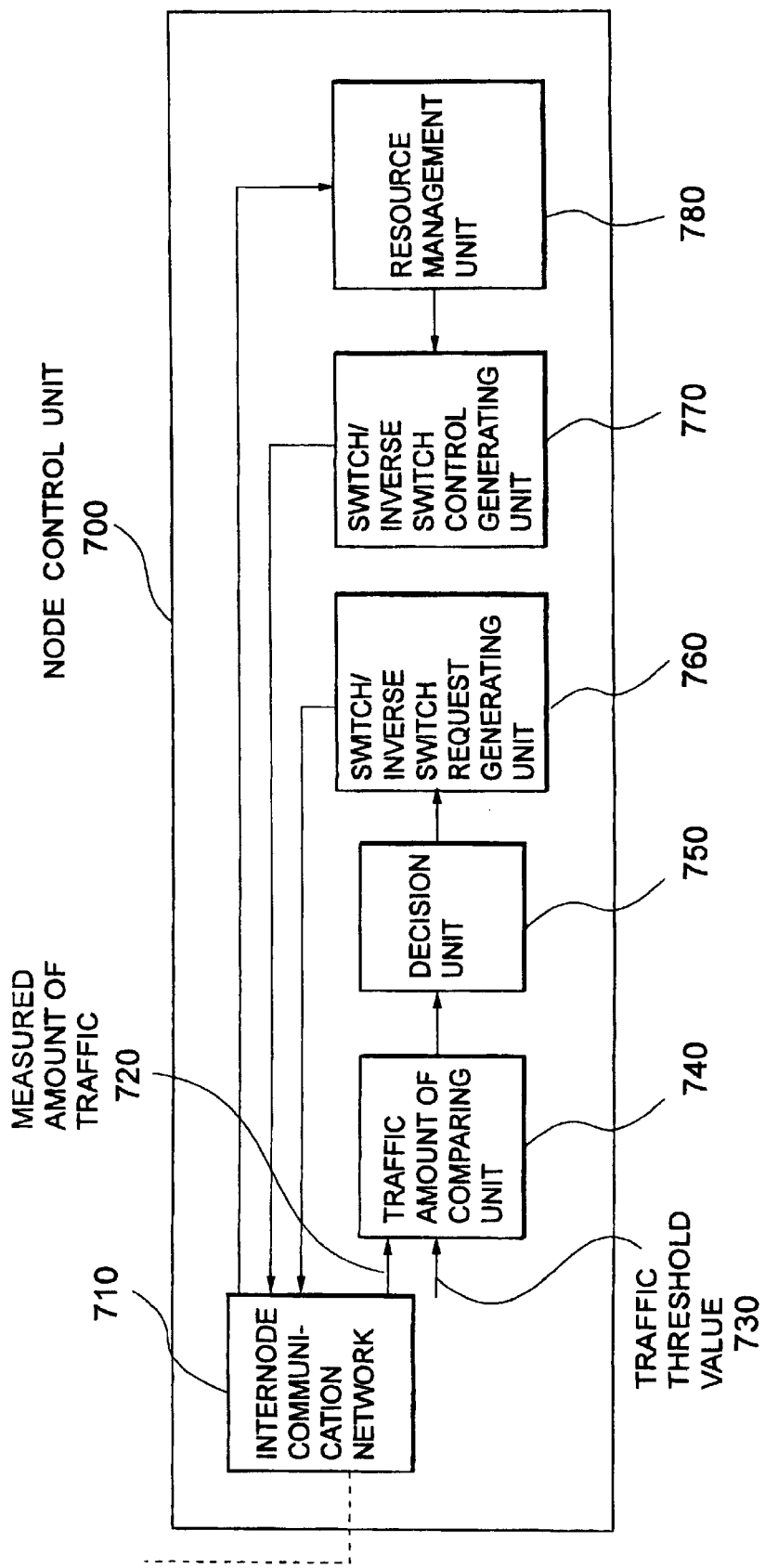
FIG. 15 is a view for use in describing operation of a node control unit illustrated in FIG. 10.

Referring to FIG. 15, operation of the node control units 504, 514, 524, and 534 according to the second embodiment of the present invention is described. In FIG. 15, a node control unit 700 indicates details of the node control units 504, 514, 524, and 534 in the network nodes 500, 510, 520, and 530, respectively described with reference to FIG. 10.

The virtual path monitor units 503, 513, 523, and 533 measure the amount of traffic across the virtual paths and produce measurements. A measured amount 720 of traffic across the virtual paths is supplied to a traffic amount comparing unit 740 via an internode communication interface 710. A traffic threshold value 730 for each virtual path is previously stored in the traffic amount comparing unit 740 in the network node 500, 510, 520, and 530.

The traffic amount comparing unit 740 compares the measured amount 720 with the traffic threshold value 730 for the individual virtual paths. The traffic amount comparing unit 340 then notifies a decision unit 750 of three different comparison results. In response to the comparison results from the traffic amount comparing unit 740, the decision unit 750 notifies a switch/inverse switch request signal generating unit 760 of a decision according to the comparing result.

The decision indicates to switch the virtual path with the measured amount 720 larger than the traffic threshold value 730, if any, should be switched from the optical path established for each transmission path to the alternate optical path established.

After the switch to the alternate optical path, the decision unit 750 notifies the switch/inverse switch request signal generating unit 760 of the decision according to the comparing results from the traffic amount comparing unit 740. The decision indicates that the virtual path with the traffic amount 520 not larger than the traffic threshold value 730, if any, should be inverse switched into the optical paths 560 through 562 that are already established for the individual transmission paths.

In response to the decision of the decision unit 750, the switch/inverse switch request signal generating unit 760 generates a switch request signal or an inverse switch request signal. The switch request signal or the inverse switch request signal is supplied to the virtual path switches 501, 511, 521, and 531 via the internode communication interface 710. The virtual switches 501, 511, 521, and 531 form the inverse switch request signal into a cell and supply the cell to the remote network nodes 500, 510, 520, or 530.

The switch control signals and the inverse switch control signals from the network nodes 500, 510, 520, and 530 are received by the virtual path switches 501, 511, 521, and 531 and then supplied to a resource management unit 780 via the internode communication interface 710.

First, description is made for the case where the virtual path is switched to an alternate optical path other than the optical paths 560 through 562 already established for the individual transmission paths. The resource management unit 780 in the network nodes 500, 510, 520, and 530 manages the resources for the virtual and optical paths in the transmission paths between the adjacent network nodes. The resource management unit 780 searches for a wavelength required for the alternate optical path in response to the switch request signal from the remote network node 500, 510, 520, or 530.

Next, after searching, the resource management unit 780 supplies available wavelength data to a switch/inverse switch control signal generating unit 770. In response to the available wavelength data, the switch/inverse switch control signal generating unit 770 generates a switch control signal for use in allocating a wavelength to the transmission paths connecting with the adjacent network nodes. The switch control signal is supplied to the virtual path switches 501, 511, 521, and 531 via the internode communication interface 710. The virtual path switches 501, 511, 521, and 531 form the switch control signal into a cell. The celled switch control signal is transmitted to the respective adjacent network nodes.

In response to the switch control signal from the remote network node 500, 510, 520, or 530, the resource management unit 780 negotiates with the adjacent network nodes to determine the wavelength to be allocated. When a certain wavelength is determined for allocation, then the switch/ inverse switch control signal generating unit 770 supplies the switch control signal for establishing an alternate optical path to the optical path switches 502, 512, 522, and 532, via the internode communication interface 710. Then, the optical path switches 502, 512, 522, and 532 establish the alternate optical path.

The embodiment illustrated in FIGS. 11 and 12 is described more in detail and specifically below. The resource management unit 780 in the network nodes 500 and 530 determines the virtual path identifier to be used for the alternate optical path 620. In this example, the network nodes 500 and 530 terminate or drop the virtual paths 541 and 542. More specifically, the resource management unit 780 in the network nodes 500 and 530 search for the virtual path identifier required for the optical path 620 in response to the switch request signals 600 and 631 from the remote network node.

Next, the resource management unit 780 in the network nodes 500 and 530 supply an available virtual path identifier to the switch/inverse switch control signal generating unit 770. The switch/inverse switch control signal generating unit 770 generates, in response to the available virtual path identifier, the switch control signal 613. The switch control signal 613 is supplied to the virtual path switches 501 and 531 via the internode communication interface 710. The virtual path switches 501 and 531 form the switch control signal 613 into a cell. The celled switch control signal 613 is supplied to the opposite network node 500 or 30. The resource management unit 780 in the opposite network node 500 or 530 determines, in response to the switch control signal 613, the virtual path to be allocated, and then generates the switch control signal 613 again. The switch control signal 613 is supplied to the virtual path switch in the other or remote network node. The virtual path switches 501 and 531 multiplex the virtual paths 541 and 542 into the optical path 620 in response to the switch control signal 613.

For the inverse switching of the virtual paths 541 and 542 from the optical path 620 to the optical paths 560 through 562, the resource management unit 780 in the network nodes 500, 510, 520, and 530 searches for the virtual path identifiers required for the optical paths 560 through 562 in response to the inverse switch request signal from the remote network node 500, 510, 520, or 530.

After searching, the resource management unit 780 supplies available virtual path identifier data to the switch/ inverse switch control signal generating unit 770. In response to the available virtual path data, the switch/inverse switch control signal generating unit 770 generates inverse switch control signals 640 through 642 for use in determining the virtual path identifiers for the virtual paths 560 through 562 between the adjacent network nodes. The inverse switch control signals 640 through 642 are supplied to the virtual path switches 501, 511, 521, and 531 via the internode communication interface 710. More specifically, the inverse switch control signal 640 is supplied to the virtual path switches 501 and 511 via the internode communication interface 710. The inverse switch control signal 641 is supplied to the virtual path switches 511 and 521 via the internode communication interface 710. The inverse switch control signal 642 is supplied to the virtual path switches 521 and 531 via the internode communication interface 710. The virtual path switches 501, 511, 521, and 531 form the inverse switch control signal 640 into a cell. The inverse switch control signals 640 through 642 are transmitted to the respective adjacent network nodes.

In response to the inverse switch control signal from the remote network node 500, 510, 520, or 530, the resource management unit 780 negotiates with the adjacent network nodes to determine the virtual path identifier to be allocated and again generates the inverse switch control signal. The inverse switch control signal is supplied to the virtual path switch in the network node. The virtual path switches 501, 511, 521, and 531 multiplex the virtual paths 541 and 542 into the optical paths 560 through 562 in response to the inverse switch control signal.

Figure 16:
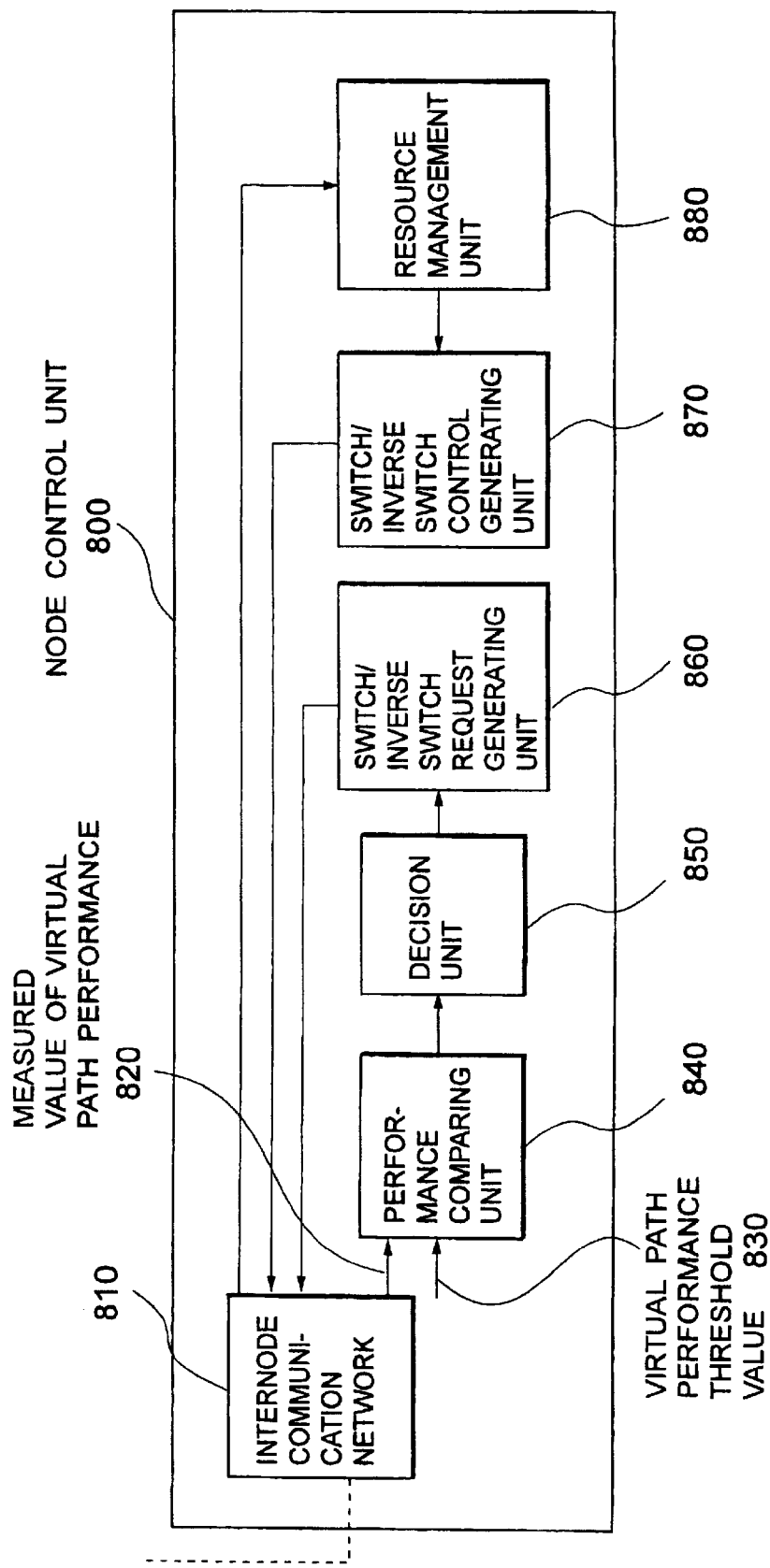
FIG. 16 is a view for use in describing different operation of the node control unit illustrated in FIG. 10.

Referring to FIG. 16, another operation of the node control units 504, 514, 524, and 534 in FIG. 10 is described.

In FIG. 16, a node control unit 800 indicates details of the node control units 504, 514, 524, and 534 in the network nodes 500, 510, 520, and 530. The node control unit 800 corresponds to and has the same function as the node control unit 400 illustrated in FIG. 9. The virtual path monitor units 503, 513, 523, and 533 does not measure the amount of traffic across the virtual paths but measure a performance data 820 for the virtual paths. The node control unit 800 shown in FIG. 16 is similar to the node control unit 700 except the kind of the measured data is different. Therefore, the description of the node control unit 800 in FIG. 16 will be similar to that of the node control unit 400 in FIG. 9 or the node control unit 700 in FIG. 15. Such a redundant description will be omitted.

According to the electro/optical combined type network node control system of the first embodiment of the present invention, the amount of traffic across the virtual paths on the route is monitored and the network management system establishes and releases the alternate optical path between the certain network nodes depending on the comparison result between the measured traffic amount and the predetermined traffic threshold value. Therefore, the plurality of optical paths and wavelengths required can be reduced without increasing load on the electrical path switches.

According to the electro/optical combined type network node control system of the second embodiment of the present invention, the amount of traffic across the virtual paths on the route is monitored and the network management system establishes and releases the alternate optical path between the certain network nodes depending on the comparison result between the measured traffic amount and the predetermined traffic threshold value. Therefore, the plurality of optical paths and wavelengths required can be reduced without increasing load on the electrical path switches. In addition, each network node carries out the switch/inverse switch control. Therefore, no network management system as in the first embodiment is required. This allows reduction in size of the system.

What is claimed is:

1. An electro/optical combined type network node control system implemented in a transport network having a plurality of optical paths and a plurality of electrical paths, the optical paths being established previously for individual transmission paths and the electrical paths being multiplexed into the optical paths, said system comprising:

first through N-th electro/optical combined type network nodes (N is an integer equal to or larger than 2) connected to each other through the transmission path, the network nodes having an electrical path switch for switching the electrical path passing therethrough and an optical path switch for switching the optical path passing therethrough; and a network management system connected to said network nodes for use in controlling said network nodes; wherein each of said network nodes is adapted to measure an amount of traffic across the electrical paths and to produce a switch request signal when the measured amount of traffic is larger than a predetermined traffic threshold value, and said network management system supplies, in response to the switch request signal, a switch control signal to said network nodes, the switch control signal indicating to establish an alternate optical path among said network nodes other than the network node producing the switch request signal and to switch the electrical paths into the alternate optical path, the network nodes in response to the switch control signal switching the electrical paths into the alternate optical path, the network nodes on the sending and the receiving sides of the alternate optical path measuring the amount of traffic across the electrical paths after switching to the alternate optical path and producing an inverse switch request signal when the measured amount of traffic is within the predetermined traffic threshold value, and said network management system producing, in response to the inverse switch request signal, an inverse switch control signal indicating to release the alternate optical path and to inverse switch the electrical paths multiplexed with the alternate optical path into said plurality of optical paths, the network nodes on the sending and the receiving sides of the alternate optical path releasing the alternate optical path in response to the inverse switch control signal and inverse switching the electrical paths multiplexed with the alternate optical path into a plurality of optical paths.

2. An electro/optical combined type network node control system as claimed in claim 1, wherein each of said network nodes comprises:

an electrical path monitor unit for use in measuring the amount of traffic across the electrical paths to produce a signal indicative of the measured amount of traffic; and a node control unit adapted to receive the signal indicative of the measured amount of traffic, the node control unit supplying the switch request signal to said network management system when the measured amount of traffic is larger than the predetermined traffic threshold value and supplying the switch control signal received from said network management system to the electrical path switch and the optical path switch.

3. An electro/optical combined type network node control system as claimed in claim 2, wherein the node control unit comprises:

a comparing unit for comparing the measured amount of traffic with the predetermined traffic threshold value for each electrical path to produce a comparison result;

a decision unit that issues, in response to the comparison result and when the measured amount of traffic is larger than the predetermined traffic threshold value, a switch request indicating to establish the alternate optical path to switch the electrical path having the traffic with the amount larger than the predetermined traffic threshold value into the alternate optical path, a switch/inverse switch request signal generating unit for generating a switch request signal in response to the switch request, and a network management system interface means for use in supplying the switch request signal and the switch control signal to said network management system and the electrical and the optical path switches, respectively.

4. An electro/optical combined type network node control system as claimed in claim 3, wherein the node control units in the network nodes on the sending and the receiving sides of the alternate optical path supply the inverse switch request signal to said network management system in response to the measured amount of traffic and when the measured amount of traffic is within the predetermined traffic threshold value, each node control unit supplying the inverse switch control signal received from said network management system to the electrical path switch and the optical path switch.

5. An electro/optical combined type network node control system as claimed in claim 4, wherein the decision units in the network nodes on the sending and the receiving sides of the alternate optical path release, in response to the comparison result and when the measured amount of traffic is not larger than the predetermined traffic threshold value, the alternate optical path and issue an inverse switch request to inverse switch the electrical path having the traffic of which the amount is not larger than the predetermined traffic threshold value into a plurality of optical paths, and the network management system interfaces means in the network nodes on the sending and the receiving sides of the alternate optical path supplying the inverse switch request signal to said network management system, each network management system interface supplies the inverse switch control signal to the electrical path switch and the optical path switch.

6. An electro/optical combined type network node control system implemented in a transport network having a plurality of optical paths and a plurality of electrical paths, the optical paths being established previously for individual transmission paths and the electrical paths being multiplexed into the optical paths, said system comprising:

first through N-th electro/optical combined type network nodes (N is an integer equal to or larger than 2) connected to each other through the transmission path, the network nodes having an electrical path switch for switching the electrical path passing therethrough and an optical path switch for switching the optical path passing therethrough; and a network management system connected to said network nodes for use in controlling said network nodes; wherein each of said network nodes is adapted to measure performance characteristics of the electrical paths and to produce a switch request signal when the measured value of performance data is larger than a predetermined performance threshold value, and said network management system supplies, in response to the switch request signal, a switch control signal to said network nodes, the switch control signal indicating to establish an alternate optical path among said network nodes other than the network node producing the switch request signal and to switch the electrical paths into the alternate optical path, the network nodes, in response to the switch control sginal, switching the electrical paths into the alternate optical path, the network nodes on the sending and the receiving sides of the alternate optical path measuring the performance characteristics of the electrical paths after switching to the alternate optical path and producing an inverse switch request signal when the measured value of performance data is within the predetermined performance threshold value, and said network management system producing, in response to the inverse switch request signal, an inverse switch control signal indicating to release the alternate optical path and to inverse switch the electrical paths multiplexed with the alternate optical path into said plurality of optical paths, the network nodes on the sending and the receiving sides of the alternate optical path releasing the alternate optical path in response to the inverse switch control signal and inverse switching the electrical paths multiplexed with the alternate optical path into the plurality of optical paths.

7. An electro/optical combined type network node control system as claimed in claim 6, wherein each of said network nodes comprises:

an electrical path monitor unit for use in measuring the performance characteristics of the electrical paths to produce a signal indicative of the measured performance data; and a node control unit adapted to receive the signal indicative of the measured value of performance data, the node control unit supplying the switch request signal to said network management system when the measured value of performance data is larger than the predetermined performance threshold value and supplying the switch control signal received from said network management system to the electrical path switch and the optical path switch.

8. An electro/optical combined type network node control system as claimed in claim 7, wherein the node control unit comprises:

a performance data comparing unit for comparing the measured value of performance data with the predetermined performance threshold value for each electrical path to produce a comparison result;

a decision unit that issues, in response to the comparison result and when the measured value of performance data is larger than the predetermined performance threshold value, a switch request indicating to establish the alternate optical path to switch the electrical path having the performance data larger than the predetermined performance threshold value into the alternate optical path, a switch/inverse switch request signal generating unit for generating a switch request signal in response to the switch request, and a network management system interface means for use in supplying the switch request signal and the switch control signal to said network management system and the electrical and the optical path switches.

9. An electro/optical combined type network node control system as claimed in claim 8, wherein the performance data is transmission characteristics data on the electrical path indicative of a cell loss factor, a cell delay time, and a bit error rate.

10. An electro/optical combined type network node control system as claimed in claim 8, wherein the node control units in the network nodes on the sending and the receiving sides of the alternate optical path supply the inverse switch request signal to said network management system in response to the measured value of performance data and when the measured performance data is within the predetermined performance threshold value, each node control unit supplying the inverse switch control signal received from said network management system to the electrical path switch and the optical path switch.

11. An electro/optical combined type network node control system as claimed in claim 10, wherein the decision units in the network nodes on the sending and the receiving sides of the alternate optical path release, in response to the comparison result and when the measured value of performance data is not larger than the predetermined performance threshold value, the alternate optical path and issue an inverse switch request to inverse switch the electrical path having the performance data which is not larger than the performance predetermined threshold value into a plurality of optical paths, and the network management system interface means in the network nodes on the sending and the receiving sides of the alternate optical path supply the inverse switch request signal to said network management system, each network management system interface means supplying the inverse switch control signal to the electrical path switch and the optical path switch.

12. An electro/optical combined type network node control system implemented in a transport network having a plurality of optical paths and a plurality of electrical paths, the optical paths being established previously for individual transmission paths and the electrical paths being multiplexed with the optical paths, said system comprising:

first through N-th electro/optical combined type network nodes (N is an integer equal to or larger than 2) connected to each other through the transmission path, the network nodes having an electrical path switch for switching the electrical path passing therethrough, an optical path switch for switching the optical path passing therethrough, and node control means connected to the electrical path switch and the optical path switch; wherein the node control means comprises an electrical path monitor unit adapted to measure an amount of traffic across the electrical paths and to produce a signal indicative of the measured amount of traffic, and a node control unit for controlling the electrical path switch and the optical path switch, the node control unit producing a switch request signal when the measured amount of traffic is larger than a predetermined traffic threshold value, and supplying a switch control signal to the node control units in the remote network nodes other than the local network node in response to the reception of the switch request signal from the node control unit in one of the remote network nodes, the switch control signal indicating to establish an alternate optical path among said network nodes other than the network node producing the control request signal and to switch the electrical paths into the alternate optical path, the optical path switch establishing the alternate optical path in response to the reception of the switch control signal through the node control unit and subsequently, the electrical path switch switching the electrical paths to the alternate optical path in response to the reception of the switch control signal through the node control unit, the node control units in the network nodes on the sending and the receiving sides of the alternate optical path producing an inverse switch request signal when the measured amount of traffic is within the predetermined traffic threshold value after switching to the alternate optical path and supplying a switch control signal to the node control units in the remote network nodes other than the local node control unit in response to the reception of the inverse switch request signal from the node control unit in one of the remote network nodes, the inverse switch control signal indicating to release the alternate optical path and to inverse switching the electrical paths multiplexed with the alternate optical path into a plurality of optical paths, the optical path switch releasing the alternate optical path in response to the inverse switch control signal through the node control unit and the electrical path switch then inverse switching the electrical paths multiplexed with the alternate optical path into a plurality of optical paths.

13. An electro/optical combined type network node control system as claimed in claim 12, wherien the node control unit comprises:

a traffic amount comparing unit for comparing the measured amount of traffic with the predetermined traffic threshold value for each electrical path to produce a comparison result;

a decision unit that issues, in response to the comparison result and when the measured amount of traffic is larger than the predetermined traffic threshold value, a switch request indicating to establish the alternate optical path to switch the electrical path having the traffic with the amount larger than the predetermined traffic threshold value into the alternate optical path, and issues an inverse switch request, when the measured amount of traffic is within the predetermined traffic threshold value, indicating to release the alternate optical path to inverse switch the electrical path having the traffic of which the amount is within the predetermined traffic threshold value into a plurality of optical paths;

a switch/inverse switch request signal generating unit for generating a switch request signal and an inverse switch request signal in response to the switch request and the inverse switch request, respectively;

a resource management unit for use in searching for, in response to the switch request signal supplied from the remote network node, a wavelength data required to establish the alternate optical path and producing a signal indicative of the wavelength data obtained, the resource management unit being also for use in searching for, in response to the inverse switch request signal supplied from the remote network node, an electrical path identifier required to inverse switch the electrical paths into a plurality of optical path and issuing the electrical path identifier obtained; and a switch/inverse switch control signal generating unit for generating a switch control signal to allocate the wavelength data obtained in response to it while generating an inverse switch control signal to allocate the electrical path identifier obtained in response to it.

14. An electro/optical combined type network node control system as claimed in claim 13, wherein the resource network management unit in the network nodes on the sending and the receiving sides of the alternate optical path searches for, in response to the inverse switch request signal supplied from the remote network node, the electrical path identifier required to switch the electrical paths into a plurality of optical path and issues the electrical path identifier obtained, and the switch/inverse switch control signal generating unit in the network nodes on the sending and the receiving sides of the alternate optical path generates the inverse switch control signal to allocate the electrical path identifier obtained in response to it.

15. An electro/optical combined type network node control system implemented in a transport network having a plurality of optical paths and a plurality of electrical paths, the optical paths being established previously for individual transmission paths and the electrical paths being multiplexed into the optical paths, said system comprising:

first through N-th electro/optical combined type network nodes (N is an integer equal to or larger than 2) connected to each other through the transmission path, the network nodes having an electrical path switch for switching the electrical path passing therethrough, an optical path switch for switching the optical path passing therethrough, and node control means connected to the electrical path switch and optical path switch; wherein the node control means comprises an electrical path monitor unit adapted to measure a performance data on the electrical paths and to produce a signal indicative of the measured performance data, and a node control unit for controlling the electrical path switch and the optical path switch, the node control unit producing a switch request signal when the measured value of performance data is larger than a predetermined performance threshold value, and supplying a switch control signal to the node control units in the remote network nodes other than the local network node in response to the reception of the switch request signal from the node control unit in one of the remote network nodes, the switch control signal indicating to establish an alternate optical path among said network nodes other than the network node producing the control request signal and to switch the electrical paths into the alternate optical path, the optical path switch establishing the alternate optical path in response to the reception of the switch control signal through the node control unit and subsequently, the electrical path switch switching the electrical paths to the alternate optical path in response to the reception of the switch control signal through the node control unit, the node control units in the network nodes on the sending and the receiving sides of the alternate optical paths producing an inverse switch request signal when the measured value of performance data is within the predetermined performance threshold value after switching to the alternate optical path and supplying a switch control signal to the node control units in the remote network nodes other than the local node control unit in response to the inverse switch request signal from the node control unit in one of the remote network nodes, the inverse switch control signal indicating to release the alternate optical path and to inverse switch the electrical paths multiplexed with the alternate optical path into a plurality of optical paths, the optical path switch releasing the alternate optical path in response to the inverse switch control signal through the node control unit and the electrical path switch then inverse switching the electrical paths multiplexed with the alternate optical path into a plurality of optical paths.

16. An electro/ optical combined type network node control system as claimed in claim 15, wherein the node control unit comprises:

a performance data comparing unit for comparing the measured value of performance data with the predetermined performance threshold value for each electrical path to produce a comparison result;

a decision unit that issues, in response to the comparison result and when the measured calue of performance data is larger than the predetermined performance threshold value, a switch request indicating to establish the alternate optical path to switch the electrical path having the performance data larger than the predetermined performance threshold value into the alternate optical path, and issues an inverse switching request, when the measured value of performance data is within the predetermined preformance threshold value, indicating to release the alternate optical path to inverse switch the electrical path having the performance data which is within the predetermined performance threshold value into a plurality of optical paths;

a switch/inverse switch request signal generating unit for generating a switch request signal and an inverse switch request signal in response to the switch request and the inverse switching request, respectively;

a resource management unit for use in searching for, in response to the switch request signal supplied from the remote network node, a wavelength data required to establish the alternate optical path and producing a signal indicative of the wavelength data obtained, the resource management unit being also for use in searching for, in response to the inverse switch request signal supplied from the remote network node, an electrical path identifier required to inverse switch the electrical paths into a plurality of optical path and issuing the electrical path identifier obtained; and a switch/inverse switch control signal generating unit for generating a switch control signal to allocate the wavelength data obtained in response to it while generating an inverse switch control signal to allocate the electrical path identifier obtained in response to it.

17. An electro/optical combined type network node control system as claimed in claim 16, wherein the performance data is transmission characteristics data on the electrical path indicatice of a cell loss factor for the individual virtual paths, a cell delay time, and a bit error rate.

18. An electro/optical combined type network node control system as claimed in claim 16, wherein the resource network management system in the network nodes on the sending and the receiving sides of the alternate optical path searches for, in response to the inverse switch request signal supplied from the remote network node, the electrical path identifier required to switch the electrical paths into a plurality of optical path and issue the electrical path identifier obtained, and the switch/inverse switch control signal generating unit in the network nodes on the sending and the receiving sides of the alternate optical path generates the switch control signal to allocate the electrical path identifier obtained in response to it.

* * * * *